(12) United States Patent
Kobayashi et al.

(10) Patent No.: US 9,813,204 B2
(45) Date of Patent: Nov. 7, 2017

(54) WIRELESS COMMUNICATION SYSTEM, WIRELESS COMMUNICATION CONTROL METHOD AND ACCESS POINT

(71) Applicant: FUJITSU LIMITED, Kawasaki-shi, Kanagawa (JP)

(72) Inventors: Takaharu Kobayashi, Yamato (JP); Dai Kimura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 85 days.

(21) Appl. No.: 14/602,675

(22) Filed: Jan. 22, 2015

(65) Prior Publication Data

US 2015/0244506 A1  Aug. 27, 2015

(30) Foreign Application Priority Data

Feb. 21, 2014  (JP) ................................ 2014-031961

(51) Int. Cl.
| | |
|---|---|
| *H04L 5/00* | (2006.01) |
| *H04B 7/024* | (2017.01) |
| *H04B 7/06* | (2006.01) |
| *H04B 7/0456* | (2017.01) |
| *H04B 7/0417* | (2017.01) |

(52) U.S. Cl.
CPC .......... *H04L 5/0035* (2013.01); *H04B 7/024* (2013.01); *H04L 5/006* (2013.01); *H04B 7/0417* (2013.01); *H04B 7/0456* (2013.01); *H04B 7/0617* (2013.01); *H04B 7/0632* (2013.01); *H04B 7/0639* (2013.01); *H04B 7/0689* (2013.01)

(58) Field of Classification Search
None
See application file for complete search history.

(56) References Cited

U.S. PATENT DOCUMENTS

| | | | | |
|---|---|---|---|---|
| 9,462,594 | B2* | 10/2016 | Ji | .................. H04W 72/082 |
| 2008/0062920 | A1* | 3/2008 | Pi | .................... H04L 1/0029 370/329 |
| 2011/0085448 | A1 | 4/2011 | Kuwahara | |
| 2012/0046039 | A1 | 2/2012 | Hagerman et al. | |
| 2013/0028138 | A1* | 1/2013 | Hao | .................. H04L 5/0051 370/254 |
| 2013/0051297 | A1* | 2/2013 | Kim | .................. H04W 52/48 370/311 |

(Continued)

FOREIGN PATENT DOCUMENTS

| | | |
|---|---|---|
| EP | 2747478 | 6/2014 |
| JP | 2011-87009 | 4/2011 |

(Continued)

OTHER PUBLICATIONS

JPOA—Office Action of Japanese Patent Application No. 2014-031961 dated Aug. 29, 2017,with relevant machine translation of the Office Action.

*Primary Examiner* — Hong Cho

(74) *Attorney, Agent, or Firm* — Fujitsu Patent Center

(57) ABSTRACT

A wireless communication system includes a first access point that forms a first wireless area and a second access point that forms a second wireless area. The first access point controls the scheduling of a terminal located in the first wireless area based on the state of a communication channel between a terminal which is a candidate for scheduling by the second access point and the first access point.

13 Claims, 16 Drawing Sheets

(56) References Cited

U.S. PATENT DOCUMENTS

| | | | |
|---|---|---|---|
| 2013/0272220 A1* | 10/2013 | Li | H04W 72/046 370/329 |
| 2013/0272250 A1 | 10/2013 | Shimezawa et al. | |
| 2014/0044044 A1* | 2/2014 | Josiam | H04W 24/10 370/328 |

FOREIGN PATENT DOCUMENTS

| | | |
|---|---|---|
| JP | 2012-138753 | 7/2012 |
| JP | 2012-527818 | 11/2012 |
| JP | 2013-042342 | 2/2013 |
| WO | 2013/145046 A1 | 10/2013 |

* cited by examiner of patent application No. 2014-031961, filed on Feb. 21, 2014, the entire contents of which are incorporated herein by reference.

FIELD

The embodiments discussed herein are directed to a wireless communication system, a wireless communication control method and an access point.

BACKGROUND

As illustrated in FIG. 1, a wireless communication system 1000 is known in which within a macrocell 1050 formed by a macro base station 1010, a pico base station 1020 whose transmission power is lower than the macro base station 1010 is arranged (for example, see patent documents 1 to 3).

The wireless communication system 1000 is called HetNet. HetNet is an abbreviation for Heterogeneous Network. The pico base station 1020 forms a picocell 1060 within the macrocell 1050. In this example, a terminal 1030 is connected to the macro base station 1010, and a terminal 1040 is connected to the pico base station 1020. In the following description, the terminal 1030 is also represented as a macro terminal 1030. The terminal 1040 is also represented as a pico terminal 1040.

In the HetNet, radio waves transmitted from the macro base station 1010 are interference with data signals received by the pico terminal 1040 from the pico base station 1020. Since the transmission power of the macro base station 1010 is higher than that of the pico base station 1020, the interference is easily increased.

A technology is known in which in order to reduce the interference, for example, the macro base station 1010 temporarily stops the transmission of radio waves. This technology is, for example, called eICIC (enhanced Inter-Cell Interference Coordination). In the eICIC, the wireless resource of the macrocell 1050 may not be effectively utilized.

A technology is also known in which without stopping the transmission of radio waves by the macro base station 1010, as illustrated in FIG. 2, the direction of a beam BM used for formation of the macrocell 1050 is controlled, and thus the interference is reduced. This technology is, for example, called CS/CB. CS/CB is an abbreviation for Coordinated Scheduling/Coordinated Beam forming.

The control of the direction of the beam is performed by, for example, executing precoding processing based on PM (Precoding Matrix). The precoding processing is processing in which weights for individual physical antennas are assigned to individual modulation symbols.

[Patent Literature 1] Japanese Laid-open Patent Publication No. 2013-42342

[Patent Literature 2] Japanese Laid-open Patent Publication No. 2012-138753

[Patent Literature 3] Japanese National Publication of International Patent Application No. 2012-527818

SUMMARY

According to one aspect, a wireless communication system includes a first access point that forms a first wireless area, and a second access point that forms a second wireless area.

The first access point controls the scheduling of a terminal located in the first wireless area based on the state of a communication channel between a terminal which is a candidate for scheduling by the second access point and the first access point.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
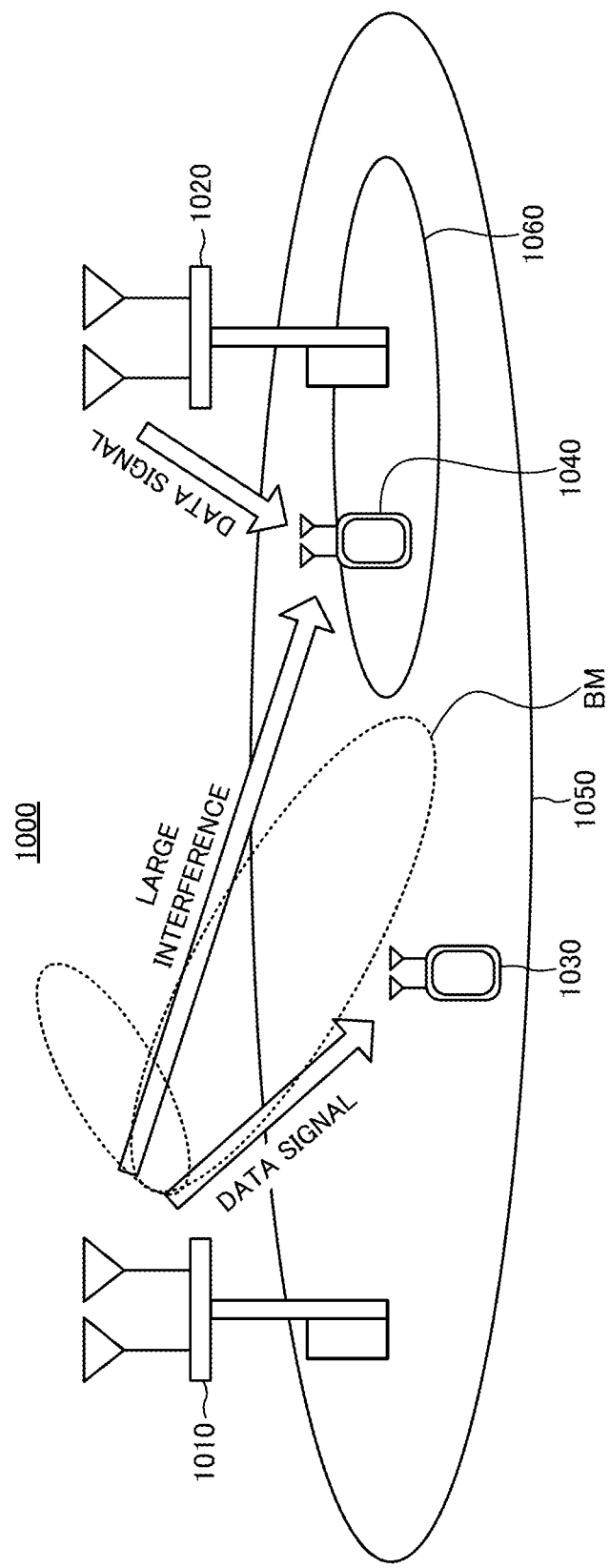
FIG. 1 is an illustrative diagram illustrating an example of interference from a macro base station with a terminal in a picocell.
Figure 2:
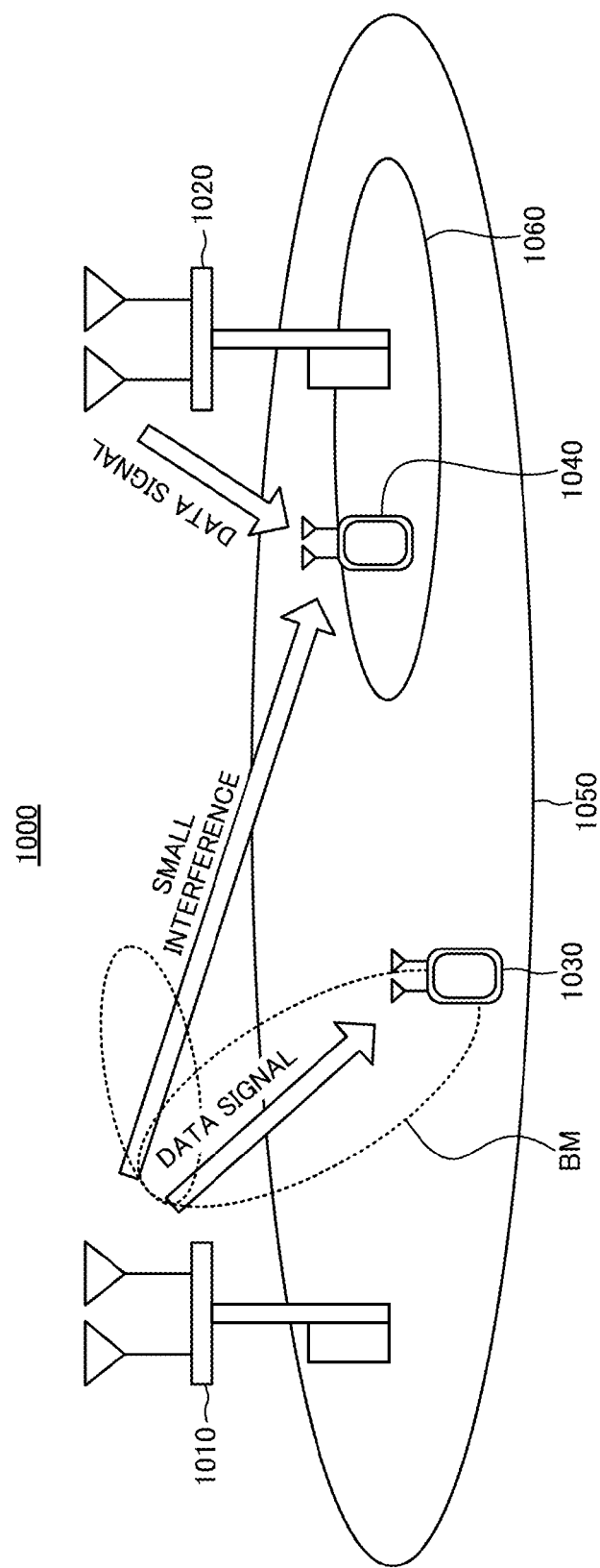
FIG. 2 is an illustrative diagram illustrating an example of the interference from the macro base station with the terminal in the picocell.

As illustrated in FIG. 2, in the CS/CB, the macro base station 1010 and the pico base station 1020 perform the scheduling of terminals such that communication with the pico terminal 1040 where interference by the beam used in the macrocell 1050 is low is performed in the picocell 1060.

Hence, depending on the distribution of terminals in a cell on one side (the macrocell 1050 or the picocell 1060), the scheduling of terminals in the cell on the other side (the picocell 1060 or the macrocell 1050) may be unbalanced. For example, a state where a wireless resource is not allocated to communication with a specific terminal may be continued.

Examples of the CS/CB may be a first method or a second method below.

(First Method)

Figure 3:
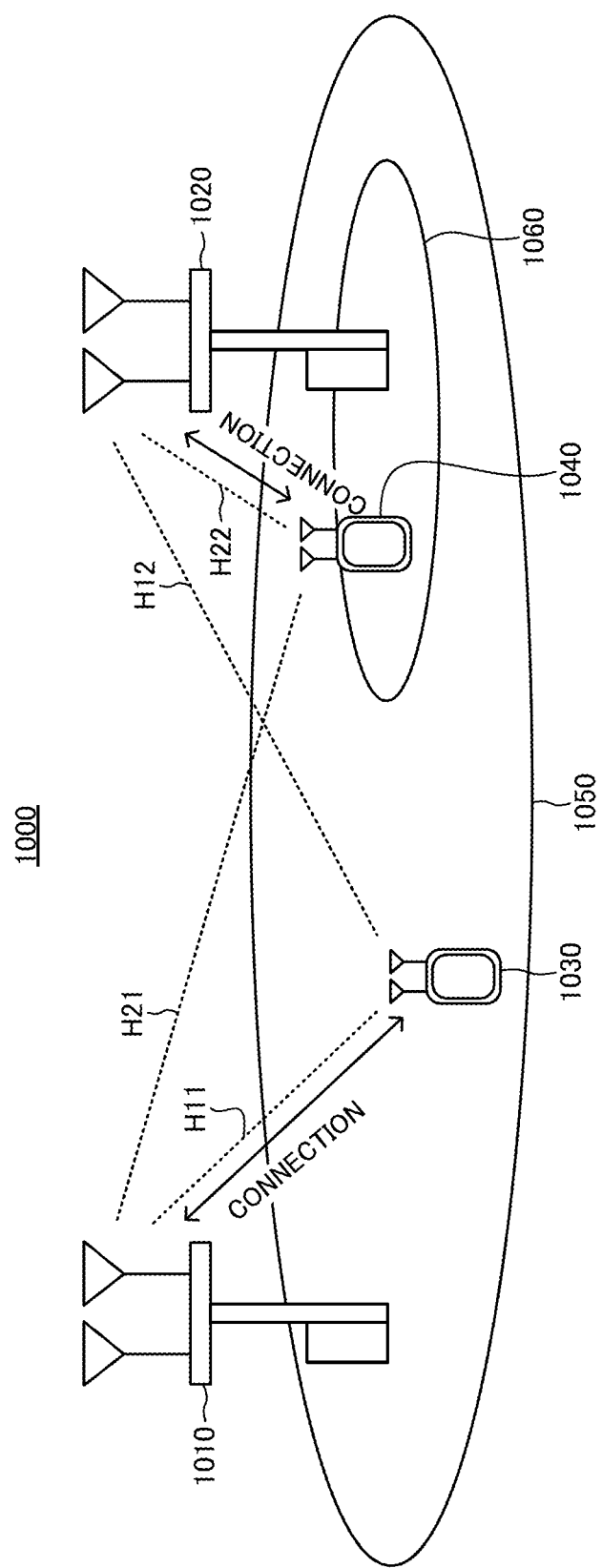
FIG. 3 is a block diagram illustrating an example of the configuration of a wireless communication system where a pico base station is located within a microcell.
Figure 4:
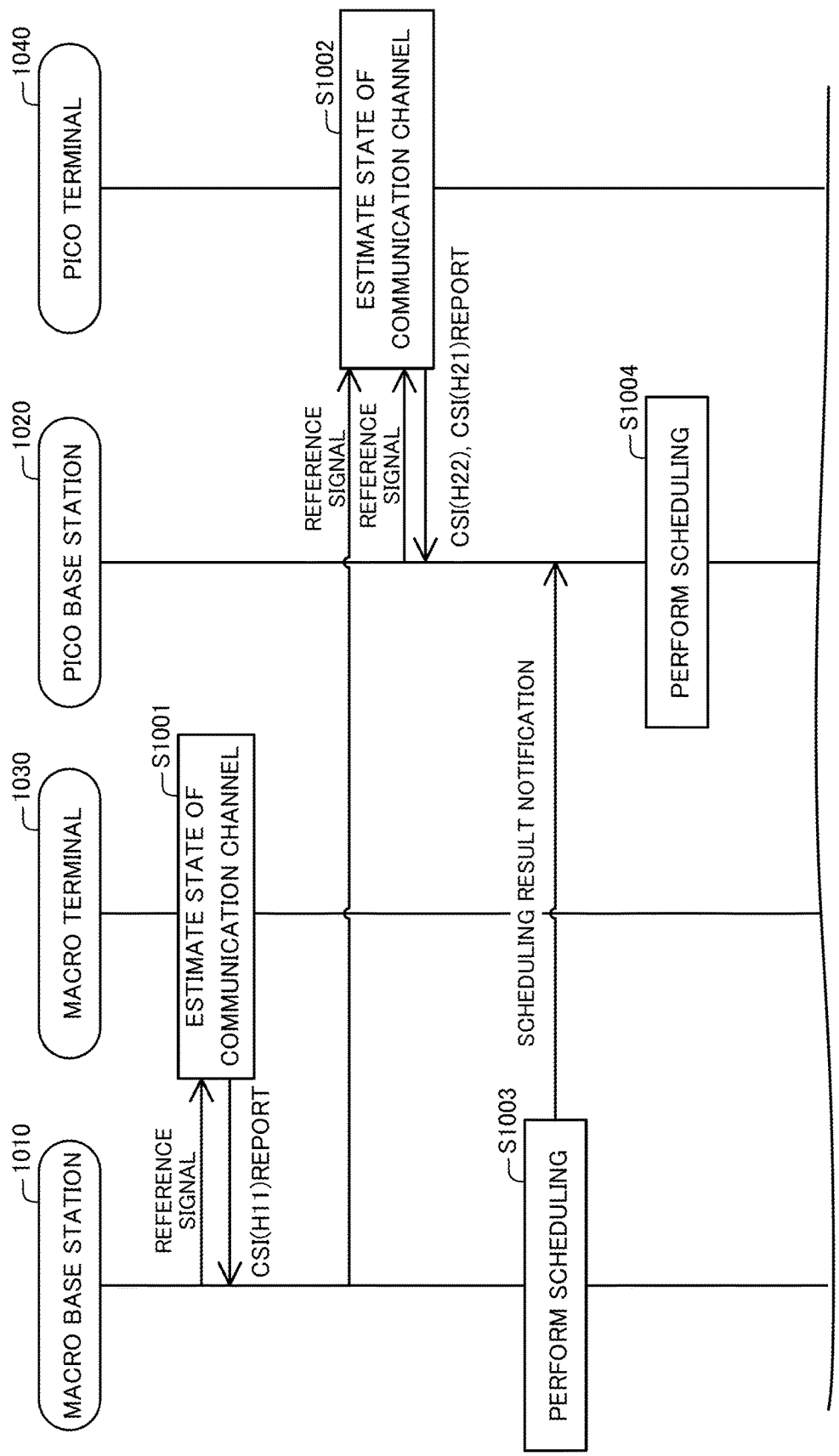
FIG. 4 is a sequence diagram illustrating an example of the operation of the wireless communication system performing CS/CB.

As illustrated in FIGS. 3 and 4, based on a reference signal transmitted from the macro base station 1010, the macro terminal 1030 estimates the state of a communication channel H11 between the macro terminal 1030 and the macro base station 1010 (step S1001 in FIG. 4). Then, the macro terminal 1030 transmits, to the macro base station 1010, a CSI report including CSI indicating the estimated state of the communication channel H11.

CSI is an abbreviation for Channel State Information. In the following description, the CSI for the communication channel H11 is also represented as the CSI (H11). The same is true for the other communication channels. The CSI includes PMI that identifies PM optimum for the communication channel (for example, for maximizing the communication quality). PMI is an abbreviation for Precoding Matrix Indicator. In the following description, the PMI included in the CSI (H11) is also represented as PMI (H11). The same is true for PMIs on the other communication channels.

Based on a reference signal transmitted from the pico base station 1020, the pico terminal 1040 estimates the state of a communication channel H22 between the pico terminal 1040 and the pica base station 1020. Furthermore, based on a reference signal transmitted from the macro base station 1010, the pico terminal 1040 estimates the state of a communication channel H21 between the pico terminal 1040 and the macro base station 1010 (step S1002 in FIG. 4). Then, the pico terminal 1040 transmits, to the pico base station 1020, a CSI report including the CSI (H22) and the CSI (H21).

On the other hand, based on the CSI (H11) received from the macro terminal 1030, the macro base station 1010 performs the scheduling of a terminal (for example, the macro terminal 1030) located in the macrocell 1050 (step S1003 in FIG. 4).

The macro base station 1010 allocates a wireless resource to the communication with the terminal located in the macrocell 1050, and determines the PM used for the wireless resource. For example, the macro base station 1010 determines a PM specified by the PMI (H11) as the PM used for the wireless resource allocated to the communication with the macro terminal 1030.

Then, the macro base station 1010 transmits, to the pico base station 1020, a scheduling result report indicating the result of the performance of the scheduling. The scheduling result report includes the PMI that specifies the PM used for the wireless resource.

Based on the scheduling result report from the macro base station 1010, the pico base station 1020 performs the scheduling of the terminal (for example, the pico terminal 1040) belonging to the picocell 1060 (step S1004 in FIG. 4). In this scheduling, the wireless resource is allocated to communication with a terminal that transmits a CSI including a PMI for specifying a PM orthogonal to the PM specified by the PMI included in the scheduling result report.

(Second Method)

Figure 5:
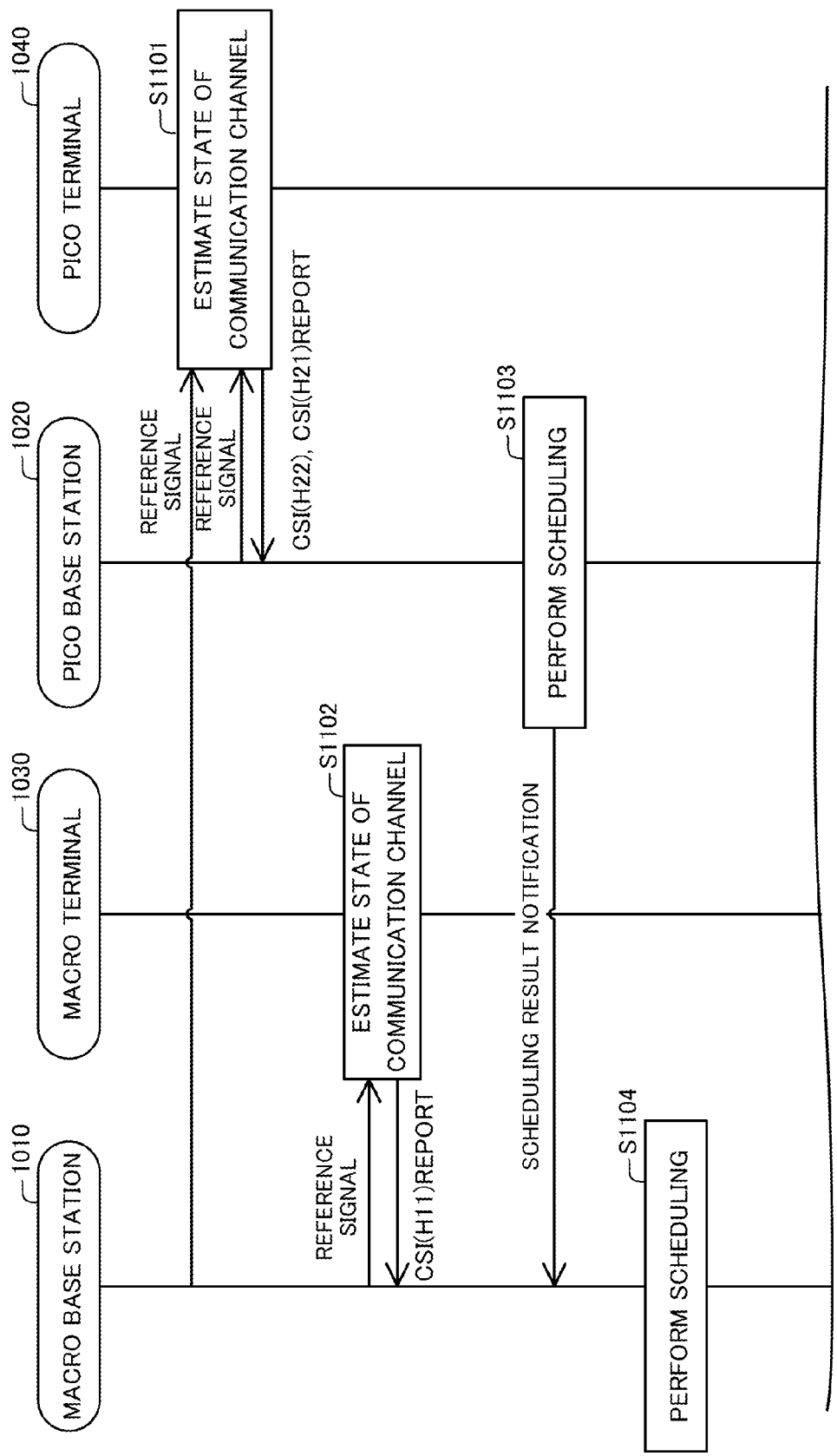
FIG. 5 is a sequence diagram illustrating an example of the operation of the wireless communication system performing the CS/CB.

As illustrated in FIGS. 3 and 5, based on a reference signal transmitted from the pico base station 1020, the pico terminal 1040 estimates the state of the communication channel H22 between the pico terminal 1040 and the pico base station 1020. Furthermore, based on a reference signal transmitted from the macro base station 1010, the pico terminal 1040 estimates the state of the communication channel H21 between the pico terminal 1040 and the macro base station 1010 (step S1101 in FIG. 5). Then, the pico terminal 1040 transmits, to the pico base station 1020, a CSI report including the CSI (H22) and the CSI (H21).

Based on the reference signal transmitted from the macro base station 1010, the macro terminal 1030 estimates the state of the communication channel H11 between the macro terminal 1030 and the macro base station 1010 (step S1102 in FIG. 5). Then, the macro terminal 1030 transmits, to the macro base station 1010, the CSI report including the CSI indicating the estimated state of the communication channel H11.

On the other hand, based on the CSI (H22) received from the pico terminal 1040, the pico base station 1020 performs the scheduling of a terminal (for example, the pico terminal 1040) belonging to the picocell 1060 (step S1103 in FIG. 5).

The pico base station 1020 allocates a wireless resource to the communication with the terminal belonging to the picocell 1060, and determines the PM used for the wireless resource. For example, the pico base station 1020 determines a PM specified by the PMI (H22) as the PM used for the wireless resource allocated to the communication with the pico terminal 1040.

Then, the pico base station 1020 transmits, to the macro base station 1010, a scheduling result report indicating the result of the performance of the scheduling. The scheduling result report includes the PMI (H21) included in the CSI (H21) transmitted by the terminal to which the wireless resource is allocated.

Based on the scheduling result report from the pico base station 1020, the macro base station 1010 performs the scheduling of the terminal (for example, the macro terminal 1030) belonging to the macrocell 1050 (step S1104 in FIG. 5). In this scheduling, the wireless resource is allocated to communication with a terminal that transmits a CSI including a PMI for specifying a PM orthogonal to the PM specified by the PMI included in the scheduling result report.

As described above, in either of the first and second methods, based on the result of the performance of the scheduling by a base station on one side (the macro base station 1010 or the pico base station 1020), the base station on the other side (the pico base station 1020 or the macro base station 1010) performs the scheduling.

Hence, depending on the distribution of terminals in a cell formed by the base station on the one side, the scheduling of terminals in the cell formed by the base station on the other side may be unbalanced. For example, a state where a wireless resource is not allocated to communication with a specific terminal may be continued.

Figure 6:
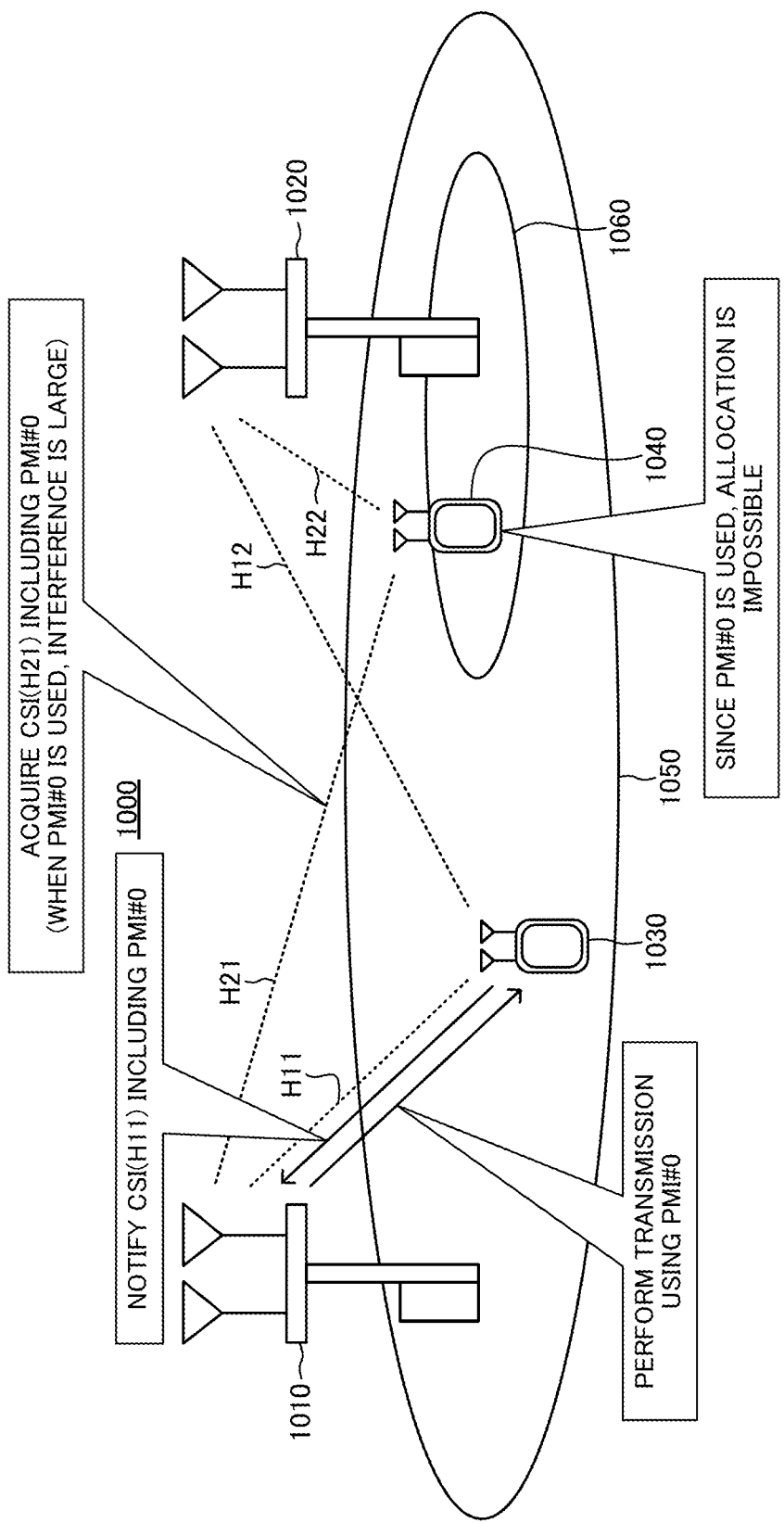
FIG. 6 is an illustrative diagram illustrating an example of the scheduling of a terminal according to the operation of FIG. 4.

For example, as illustrated in FIG. 6, in the first method, it is assumed that based on the reference signal from the macro base station 1010, the PMI (H11) included in the CSI (H11) acquired by the macro terminal 1030 is PMI #0. PMI #i represents the i-th PMI (here, i represents an integer of 0 or more). In this case, the macro base station 1010 allocates the wireless resource to the communication with the macro terminal 1030, and determines that the PMI #0 is used for the wireless resource.

Furthermore, in this case, it is also assumed that based on the reference signal from the macro base station 1010, the PMI (H21) included in the CSI (H21) acquired by the pico terminal 1040 is also PMI #0. In this case, since in the wireless resource for which the macro base station 1010 uses the PMI #0, interference from the macro base station 1010 in the pico terminal 1040 is easily increased, the pico base station 1020 does not allocate the wireless resource to the communication with the pico terminal 1040.

As described above, in the first method, the allocation of the wireless resource to the macro terminal 1030 is prioritized, and consequently, the wireless resource is not allocated to the pico terminal 1040.

Moreover, in the second method, the allocation of the wireless resource to the pico terminal 1040 is prioritized, and consequently, the wireless resource is not allocated to the macro terminal 1030.

By contrast, as will be described later, a first base station according to a first embodiment controls, based on the state of a communication channel between a terminal that is a candidate for scheduling by a second base station and the first base station, the scheduling of a terminal located on a first wireless area.

In this way, the state of the communication channel between the terminal that is the candidate for scheduling by the second base station and the first base station can be reflected on the control of the scheduling of the terminal located in the first wireless area. Consequently, it is possible to reduce the unbalance of the scheduling of terminals.

Embodiments of the present disclosure will be described below with reference to accompanying drawings. However, the embodiments that will be described below are illustrative. Hence, the application of various variations and technologies that will not be explicitly described below to the embodiments is not excluded. In the drawings used in the embodiments below, parts to which the same symbols are attached represent the same or similar parts unless otherwise modifications or variations are explicitly described.

First Embodiment

A wireless communication system according to the first embodiment will be described in detail below.

(Configuration)

Figure 7:
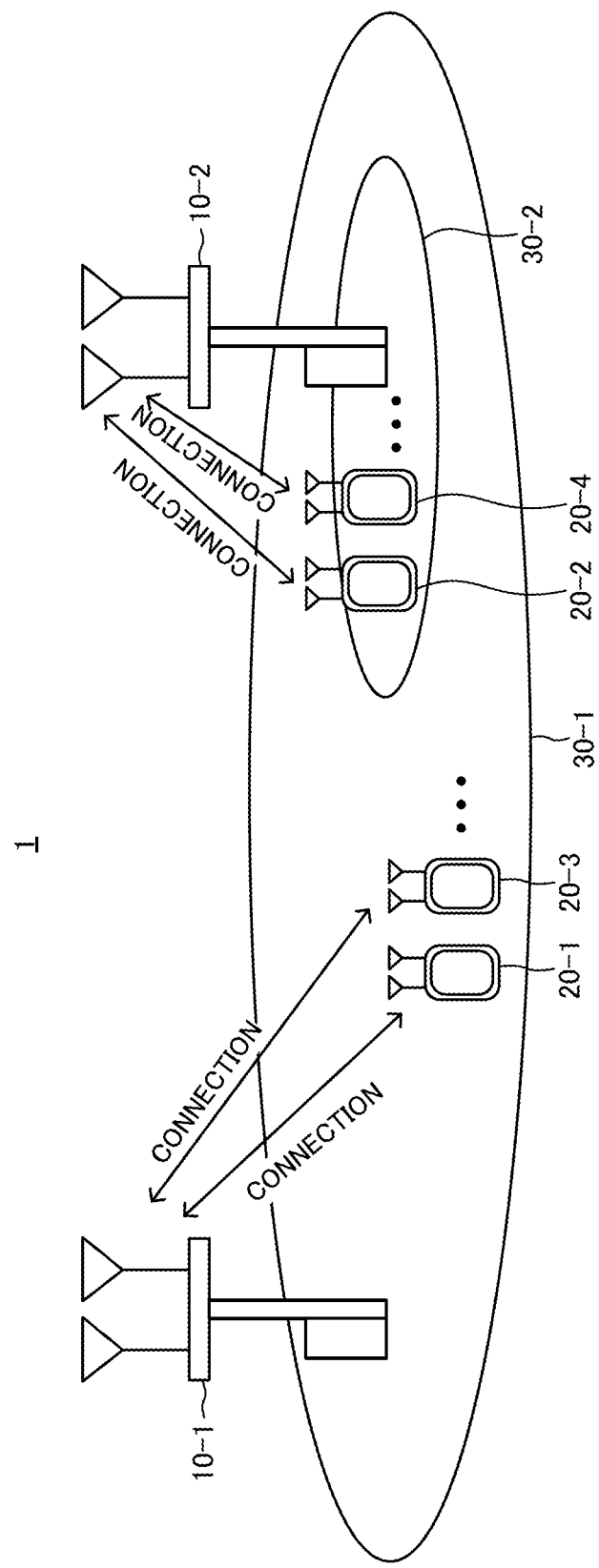
FIG. 7 is a block diagram illustrating an example of the configuration of a wireless communication system according to a first embodiment.

As illustrated in FIG. 7, the wireless communication system 1 according to the first embodiment includes $N_b$ base stations 10-1, 10-2, . . . , and 10-$N_b$, and $N_u$ terminals 20-1, 20-2, 20-3, 20-4, . . . , and 20-$N_u$.

In this example, $N_b$ represents an integer of 2 or more. In the following description, base station 10-x is also represented as base station 10 when they do not need to be distinguished. Here, x represents integers from 1 to $N_b$. In this example, $N_u$ represents an integer of 4 or more. $N_u$ may represent 2 or 3. Moreover, in the following description, terminal 20-y is also represented as terminal 20 when they do not need to be distinguished. Here, y represents integers from 1 to $N_u$.

In the wireless communication system 1, wireless communication is performed between the base station 10 and the terminal 20 according to a certain wireless communication method. For example, the wireless communication method is an LTE-Advanced method. LTE is an abbreviation for Long Term Evolution. The wireless communication method may be a method that is different from the LTE-Advanced method (for example, a method such as LTE or WiMAX (registered trademark)). WiMAX is an abbreviation for Worldwide Interoperability for Microwave Access.

In this example, each base station 10 forms one wireless area. Each base station 10 may forma plurality of wireless areas. The wireless area may be represented as a coverage area or a communication area. For example, the wireless area is a cell such as a macrocell, a microcell, a nanocell, a picocell, a femtocell, a homecell or a sector cell. Each base station 10 performs wireless communication with the terminal 20 located within the wireless area formed by its own station.

For example, each base station 10 provides the wireless resource in the wireless area formed by its own station. In this example, the wireless resource may include time and frequency. In other words, the wireless resource is identified by time and frequency. Each base station 10 uses the terminal 20 located within the wireless area formed by its own station and the wireless resource provided in the wireless area, and thereby performs communication.

Furthermore, in this example, each base station 10 performs precoding processing based on a precoding matrix, and transmits a wireless signal on which the precoding processing has been performed from a plurality of antennas (physical antennas) to the terminal 20. The precoding processing is processing in which weights for individual physical antennas are assigned to individual modulation symbols indicating data such that directional transmission (beam forming) to the terminal 20 is performed. The beam forming is to form a beam having a directivity as a wireless signal transmitted by the base station 10. The determination of the precoding matrix used in the precoding processing is an example of the determination of the direction of the beam.

Each base station 10 may be configured so as to perform, according to the state of communication, spatial multiplexing transmission or MIMO multiplexing transmission in which a wireless resource is used to transmit a plurality of data streams. MIMO is an abbreviation for Multiple-Input and Multiple-Output.

Each base station 10 may be an eNB (Evolved Node B), a NB (Node B), a macro base station, a micro base station, a nano base station, a pico base station, a femto base station or a home base station. Each base station 10 is an example of an access point.

In this example, the base station 10-1 is a macro base station. The macro base station 10-1 is an example of a first access point. The base station 10-2 is a pico base station. The pico base station 10-2 is an example of a second access point. The wireless communication system 1 may include, instead of the pico base station 10-2, a RRH (Remote Radio Head) connected to the macro base station 10-1. In this case, the RRH is an example of the second access point.

In this example, in the macro base station 10-1, the maximum value of the power that can be output as the transmission power of the wireless signal is higher than in the pico base station 10-2. Hence, a wireless area 30-1 formed by the macro base station 10-1 is wider than a wireless area 30-2 formed by the pico base station 10-2. The wireless area 30-1 is also represented by a macrocell. The macrocell 30-1 is an example of the first wireless area. The wireless area 30-2 is also represented by a picocell. The picocell 30-2 is an example of the second wireless area.

In this example, the pico base station 10-2 is arranged within the macrocell 30-1 formed by the macro base station 10-1. Furthermore, the picocell 30-2 formed by the pico base station 10-2 is located within the macrocell 30-1. A plurality of picocells may be located within the macrocell 30-1.

In this example, the terminals 20-1 and 20-3 are located within the macrocell 30-1. In this example, the terminals 20-2 and 20-4 are located within the picocell 30-2. In the following description, the terminal 20 located within the macrocell 30-1 is also represented as a macro terminal. Likewise, the terminal 20 located within the picocell 30-2 is also represented as a pico terminal. Each pico terminal 20 is an example of a terminal that is a candidate for scheduling by the pico base station 10-2.

In this example, each base station 10 is connected through an unillustrated communication line to a communication network (for example, a core network) such that wire communication can be performed. Each base station 10 may be connected to the communication network such that wireless communication can be performed. An interface between the base station 10 and the communication network may be called an S1 interface. An interface between the base stations 10 may be called an X2 interface.

The base station 10 and a part of the wireless communication system 1 on the side of the communication network (that is, upper side) with respect to the base station 10 may be called E-UTRAN. E-UTRAN is an abbreviation for Evolved Universal Terrestrial Radio Access Network.

Each terminal 20 uses the wireless resource provided in the wireless area where its own terminal is located, and thereby performs wireless communication with the base station 10 forming the wireless area. The terminal 20 may be called a mobile station, a terminal device or a user terminal (UE: User Equipment).

For example, the accommodation of the terminal 20 in the wireless area is that the terminal 20 is connected to the base station 10 such that the terminal 20 uses the wireless resource provided in the wireless area and thereby can exchange data with the base station 10 forming the wireless area.

Each base station 10 transmits a reference signal (RS). For example, the reference signal is CRS, CSI RS or UES RS. CRS is an abbreviation for Cell-Specific RS. UES is an abbreviation for UE-Specific.

Each terminal 20 estimates, based on the reference signal received from each base station 10, the state of a communication channel between the base station 10 and the terminal 20. Then, each terminal 20 transmits a CSI report including the CSI indicating the estimated state of the communication channel to the base station 10 forming the wireless area where its own terminal is located. In this example, the CSI includes CQI and PMI. CQI is an abbreviation for Channel Quality Indicator. The CQI indicates the quality of communication in the communication channel.

For example, the CSI includes PMI that identifies the PM optimum (for example, maximizing the communication quality) for the communication channel. The PM optimum for the communication channel is, for example, the PM that maximizes SINR. SINR is an abbreviation for Signal to Interference plus Noise Ratio. The CSI may include PMI that specifies the PM whose communication quality is lower than the PM that maximizes the communication quality.

(Configuration: Base Station)

Figure 8:
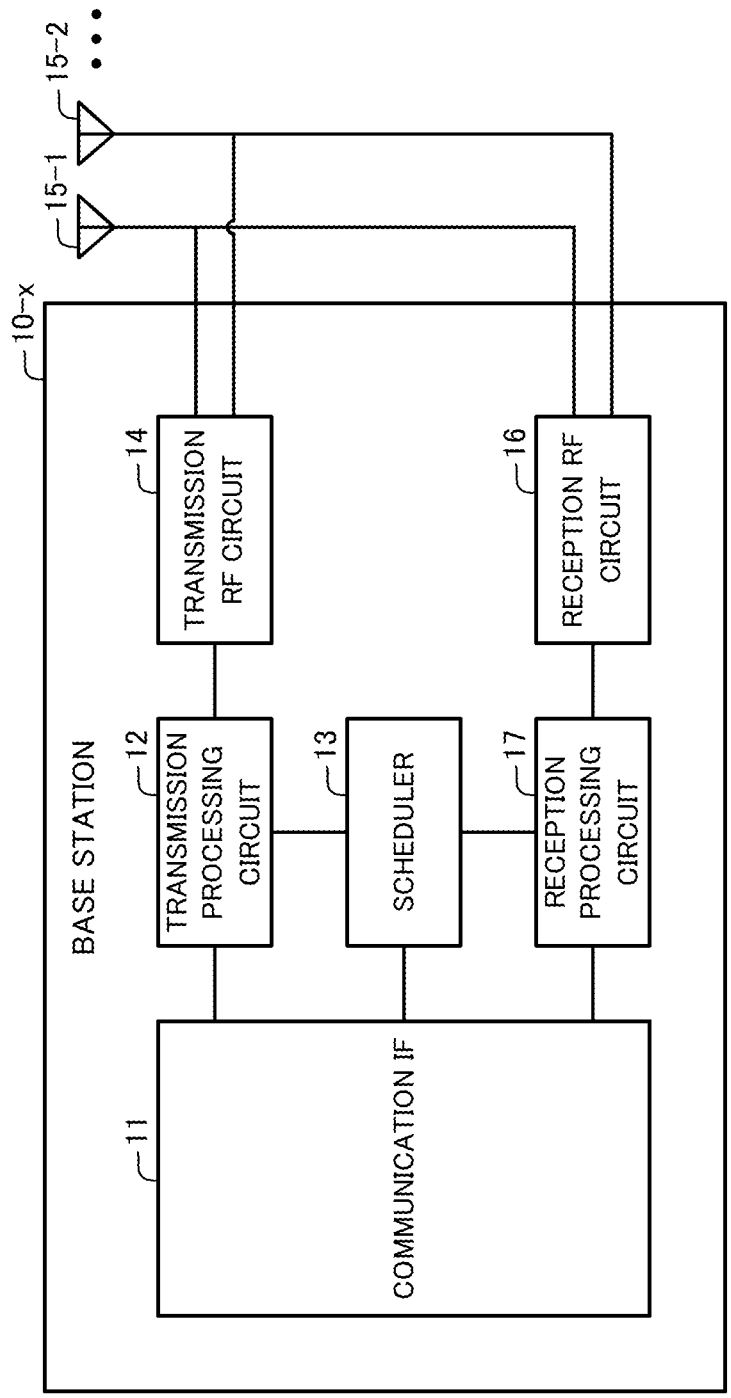
FIG. 8 is a block diagram illustrating an example of the configuration of the base station of FIG. 7.

As illustrated in FIG. 8, the base station 10-x includes, as an example, a communication IF 11, a transmission processing circuit 12, a scheduler 13, a transmission RF circuit 14, $N_a$ antennas 15-1, 15-2, . . . , and 15-$N_a$, a reception RF circuit 16 and a reception processing circuit 17. IF is an abbreviation for Interface.

In this example, $N_a$ represents an integer of 2 or more. In the following description, antenna 15-z is also represented as antenna 15 when they do not need to be distinguished. Here, z represents integers from 1 to $N_a$.

The scheduler 13 performs the scheduling of the terminal 20 located within the wireless area formed by its own station. In this example, the scheduling includes the allocation of a wireless resource to the communication with the terminal 20 for a downlink and an uplink.

Furthermore, in this example, the scheduling includes the determination of the PMI that identifies the PM used for the wireless resource allocated to the downlink communication. The PMI is selected from among a plurality of PMIs that identify a plurality of certain PMs. In this example, beams formed by using a plurality of PMs have a plurality of directions.

The detailed function of the scheduler 13 will be described later.

Based on the result of the scheduling by the scheduler 13, the transmission processing circuit 12 performs, according to the wireless communication method, coding and modulation on data input from the communication IF 11 or the scheduler 13.

In this example, the transmission processing circuit 12 performs precoding processing on a modulation signal that is obtained by performing coding and modulation on the terminal 20 where the wireless resource is allocated to the downlink communication by the scheduler 13. The precoding processing is performed based on the PM that is identified by the PMI which is determined by the scheduler 13 to be used for the wireless resource.

The transmission RF circuit 14 performs DA conversion and frequency conversion (here, upconversion) on the modulation signal on which the precoding processing has been performed. DA is an abbreviation for Digital to Analog. The transmission RF circuit 14 transmits the wireless signal on which the frequency conversion has been performed through a plurality of antennas 15-1, 15-2, . . . , and 15-$N_a$.

The reception RF circuit 16 receives the wireless signal through the antenna 15. The reception RF circuit 16 performs frequency conversion (here, downconversion) and AD conversion on the received wireless signal. AD is an abbreviation for Analog to Digital.

The reception processing circuit 17 performs demodulation and decoding on the modulation signal on which the AD conversion has been performed, based on the result of the scheduling by the scheduler 13, according to the wireless communication method. The reception processing circuit 17 outputs the decoded data to the communication IF 11 or the scheduler 13.

The communication IF 11 transmits the data input from the scheduler 13 or the reception processing circuit 17 through the communication network to another base station 10 or an unillustrated exchange station. The communication IF 11 outputs the data received from the other base station 10 or the unillustrated exchange station through the communication network to the transmission processing circuit 12 or the scheduler 13.

The function of the base station 10-x may be realized by using a LSI (Large Scale Integration). The functions of the transmission processing circuit 12, the scheduler 13 and at least part of the reception processing circuit 17 may be realized by using a programmable logic circuit device (for example, a PLD or an FPGA). PLD is an abbreviation for Programmable Logic Device. FPGA is an abbreviation for Field-Programmable Gate Array.

The functions of the transmission processing circuit 12, the scheduler 13 and at least part of the reception processing circuit 17 may be realized by using, for example, a processing device such as a CPU or a DSP and a storage device. In this case, for example, the processing device may perform a program stored in a storage device to realize the functions of the transmission processing circuit 12, the scheduler 13 and the reception processing circuit 17. CPU is an abbreviation for Central Processing Unit. DSP is an abbreviation for Digital Signal Processor.

Here, the function of the scheduler 13 will be further described.

The scheduler 13 of the pico base station 10-2 calculates a desired weight $w_p$ of the pico terminal 20 for each PMI based on formula 1 and the CSI report received from each pico terminal 20. The desired weight of the pico terminal 20 is also referred to as a pico-side desired weight. Here, $w_p(i)$ represents a value for the PMI #i. PMI #i represents the i-th PMI. Here, i represents a positive integer.

$$w_p(i) = \sum_{k \in P} \frac{O(i, T_{PMI}(k))}{\sum_{j \in C} O(j, T_{PMI}(k))}$$ [Formula 1]

Here, P represents an aggregation of the pico terminals 20. C presents an aggregation of the PMIs. $T_{PMI}(k)$ represents the PMI included in the CSI indicating the state of the communication channel between a terminal #k and the macro base station 10-1. The terminal #k represents the k-th terminal 20. Here, k represents a positive integer.

O(i, j) is represented by formula 2. F(i) represents the PM that is identified by the i-th PMI. $F(j)^H$ represents the conjugate transpose matrix of F(j). Hence, O(i, j) is a function in which when F(i) is orthogonal to F(j), it is 1 whereas when F(i) is equal to F(j), it is 0.

$$O(i,j)=1-\|F(i)^H F(j)\|$$ [Formula 2]

The scheduler 13 of the pico base station 10-2 transmits a pico-side desired weight report including the pico-side desired weight $w_p$ for each PMI through the communication IF 11 to the macro base station 10-1.

The scheduler 13 of the macro base station 10-1 calculates a desired weight $w_m$ of the macro terminal 20 for each PMI based on formula 3 and the CSI report received from each macro terminal 20. The desired weight of the macro terminal 20 is also referred to as a macro-side desired weight. Here, $w_m(i)$ represents a value for the PMI #i. Here, M represents an aggregation of the macro terminals 20.

$$w_m(i) = \sum_{k \in M} \frac{1 - O(i, T_{PMI}(k))}{\sum_{j \in C} (1 - O(j, T_{PMI}(k)))}$$ [Formula 3]

The scheduler 13 of the macro base station 10-1 calculates a target value Q of an allocation rate for each PMI based on formula 4, the pico-side desired weight $w_p$ included in the pico-side desired weight report received from the pico base station 10-2 and the macro-side desired weight $w_m$. Q(i) represents a value for the PMI #i. An allocation rate for the PMI #i indicates a ratio of the wireless resource for which the PM identified by PMI #i is used to the wireless resource that is provided by the macrocell 30-1 and that can be allocated to communication from the macro base station 10-1 to the macro terminal 20.

$$Q(i) = \frac{w_p(i) + w_m(i)}{\sum_{j \in C} (w_p(j) + w_m(j))}$$ [Formula 4]

Hence, the target value Q(i) for the PMI #i is increased as the number of pico terminals 20 where the PM identified by the PMI #i is orthogonal to the PM identified by the PMI included in the CSI indicating the state of the communication channel between the pico terminal 20 and the macro base station 10-1 is increased.

Furthermore, the target value Q(i) for the PMI #i is increased as the degree to which the PM identified by the PMI #i is orthogonal to the PM identified by the PMI included in the CSI indicating the state of the communication channel between the pico terminal 20 and the macro base station 10-1 is increased.

In this way, the probability that a beam in a direction is used can be increased as the degree to which to be orthogonal to the direction of the beam corresponding to the state of the communication channel between the pico terminal 20 and the macro base station 10-1 is increased. Consequently, it is possible to reduce, in the pico terminal 20, interference from the macro base station 10-1 to the wireless signal from the pico base station 10-2.

Furthermore, the target value Q(i) for the PMI #i is increased as the number of macro terminals 20 where the PM identified by the PMI #i coincides with the PM identified by the PMI included in the CSI indicating the state of the communication channel between the macro terminal 20 and the macro base station 10-1 is increased.

Moreover, the target value Q(i) for the PMI #i is increased as the degree to which the PM identified by the PMI #i coincides with the PM identified by the PMI included in the CSI indicating the state of the communication channel between the macro terminal 20 and the macro base station 10-1 is increased.

In this way, the probability that a beam in a direction is used can be increased as the degree to which to coincide with the direction of the beam corresponding to the state of the communication channel between the macro terminal 20 and the macro base station 10-1 is increased. Consequently, it is possible to enhance, in the macro terminal 20, the quality of the wireless signal from the macro base station 10-1.

Furthermore, the scheduler 13 of the macro base station 10-1 selects the macro terminal 20 based on the target value Q of the allocation rate, and allocates the wireless resource to downlink communication with the selected terminal 20. In this example, the scheduler 13 allocates the wireless resource for each predetermined unit of control. In this example, the unit of control is a sub-frame. The unit of control may be a resource block.

Furthermore, the scheduler 13 of the macro base station 10-1 determines the PM used for the allocated wireless resource based on the PMI included in the CSI indicating the state of the communication channel between the macro terminal 20 to which the wireless resource is allocated and the macro base station 10-1. For example, the scheduler 13 of the macro base station 10-1 determines the PM identified by the PMI included in the CSI as the PM used for the allocated wireless resource.

The selection of the macro terminal 20 based on the target value Q of the allocation rate will be further described.

In this example, the scheduler 13 calculates a selection metric U for each macro terminal 20 based on formula 5. U(k) represents a value for a terminal #k.

$$U(k) = \alpha(T_{PMI}(k))\frac{r(k)}{R(k)}$$ [Formula 5]

Here, α(i) represents an adjustment factor for selecting the terminal 20 for the PMI #i. Here, r(k) represents an instantaneous value for the throughput of communication from the macro base station 10-1 to the terminal #k. The instantaneous value for the throughput is also referred to as an instantaneous throughput. R(k) represents the average value of the throughput of the communication from the macro base station 10-1 to the terminal #k. The average value of the throughput is also referred to as an average throughput. In this example, the average throughput R(k) is the average value of a plurality of instantaneous throughputs r(k).

A value r/R obtained by diving the instantaneous throughput r by the average throughput R is also referred to as a PF metric. PF is an abbreviation for Proportional Fairness or Proportional Fair. Hence, the selection metric U is a value obtained by multiplying the PF metric by the adjustment factor α.

In this example, the scheduler 13 uses "1" as the initial value of the adjustment factor α.

When the scheduler 13 determines, as the PM used for the allocated wireless resource, the PM identified by the PMI #i, the scheduler 13 updates the adjustment factor α(i) for the PMI #i based on formula 6. Furthermore, in this case, the scheduler 13 updates the adjustment factor α(j) for the PMI #j based on formula 7. Here, j represents an integer different from i. $\Delta_\alpha$ represents an adjustment factor for a speed at which the allocation rate after the scheduling is converged into the target value of the allocation rate. In this example, the adjustment factor $\Delta_\alpha$ is a positive value.

$$\alpha(i)=\alpha(i)-\Delta_\alpha(1-Q(i))$$ [Formula 6]

$$\alpha(j)=\alpha(j)+\Delta_\alpha Q(j)$$ [Formula 7]

The selection metric U may be a value obtained by multiplying max CIR metric by the adjustment factor α. Here, max CIR is an abbreviation for Maximum Carrier-to-Interference Power Ratio. For example, the max CIR metric may be a value of the CQI.

In this way, the scheduler 13 controls, based on the target value Q, the probability that the wireless resource is allocated to the downlink communication with the macro terminal 20, such that the allocation rate after the scheduling for each PMI is brought close to the target value Q of the allocation rate.

Hence, the scheduling of the macro terminal 20 is controlled according to the direction of the beam corresponding to the state of the communication channel between the macro terminal 20 and the macro base station 10-1, and thus it is possible to bring the allocation rate after the scheduling for each PMI close to the target value. Consequently, it is possible to reduce the unbalance of the scheduling of the terminals 20 located in the macrocell 30-1 and the picocell 30-2.

As described above, the scheduler 13 of the macro base station 10-1 performs the scheduling of the macro terminal 20, and thereafter transmits the scheduling result report indicating the result of the performance of the scheduling through the communication IF 11 to the pico base station 10-2. The scheduling result report includes the PMI that identifies the PM used for the wireless resource for each unit of control.

The scheduler 13 of the pico base station 10-2 performs the scheduling of the pico terminal 20 based on the scheduling result report received from the macro base station 10-1 and the CSI report received from the pico terminal 20.

In this example, the scheduler 13 of the pico base station 10-2 prioritizes, for each unit of control, the pico terminal 20 that increases the degree to which a macro-side PM is orthogonal to a pico-side desired PM, and allocates the wireless resource to the communication from the pico base station 10-2 to the pico terminal 20. The macro-side PM is a PM that is identified by the PMI included in the scheduling result report. The pico-side desired PM is a PM that is identified by the PMI included in the CSI indicating the communication channel between the pico base station 10-2 and the pico terminal 20.

Then, the scheduler 13 of the pico base station 10-2 determines the PM used for the allocated wireless resource based on the PMI included in the CSI indicating the communication channel between the pico terminal 20 to which the wireless resource is allocated and the pico base station 10-2. For example, the scheduler 13 of the pico base station 10-2 determines the PM identified by the PMI included in the CSI as the PM used for the allocated wireless resource.

Table 1 represents a brief description of the variables described above.

TABLE 1

| Variables | Description |
|---|---|
| $w_p(i)$ | Desired weight of pico terminal for PMI #i |
| $w_m(i)$ | Desired weight of macro terminal for PMI #i |
| P | Aggregation of pico terminals |
| $T_{PMI}(k)$ | Optimum PMI for macro base station of terminal #k |
| F(i) | Precoding matrix identified by PMI #i |
| C | Aggregation of PMIS |
| O(i, j) | Degree to which F(i) is orthogonal to F(j) (1 when they are orthogonal) |
| M | Aggregation of macro terminals |
| Q(i) | Target value of allocation rate of PMI #i |
| U(k) | Selection metric of terminal #k |
| r(k) | Instantaneous throughput of terminal #k |
| R(k) | Average throughput of terminal #k |
| α(i) | Adjustment factor of terminal selection for PMI #i |
| $\Delta_\alpha$ | Adjustment factor of convergence speed for target value of allocation rate |

(Operation)

The operation of the wireless communication system 1 will be described with reference to FIGS. 9 and 10. Here, part of the operation of the wireless communication system 1 related to the scheduling of the terminal 20 will be described.

Figure 9:
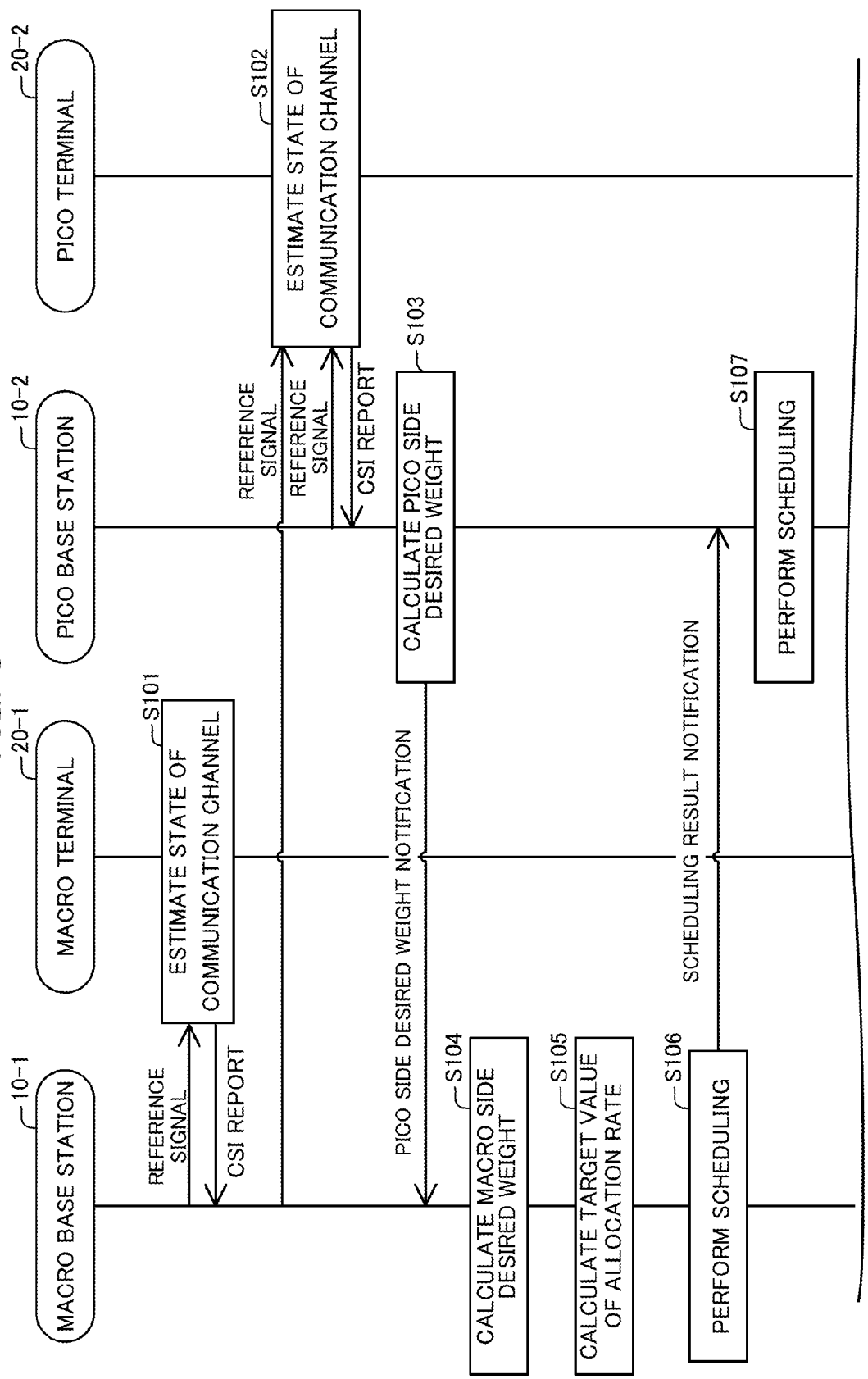
FIG. 9 is a sequence diagram illustrating an example of the operation of the wireless communication system of FIG. 7.

FIG. 9 illustrates a macro terminal 20-1, and the other macro terminals 20 are operated in the same manner. Likewise, FIG. 9 illustrates a pico terminal 20-2, and the other pico terminals 20 are operated in the same manner.

Figure 10:
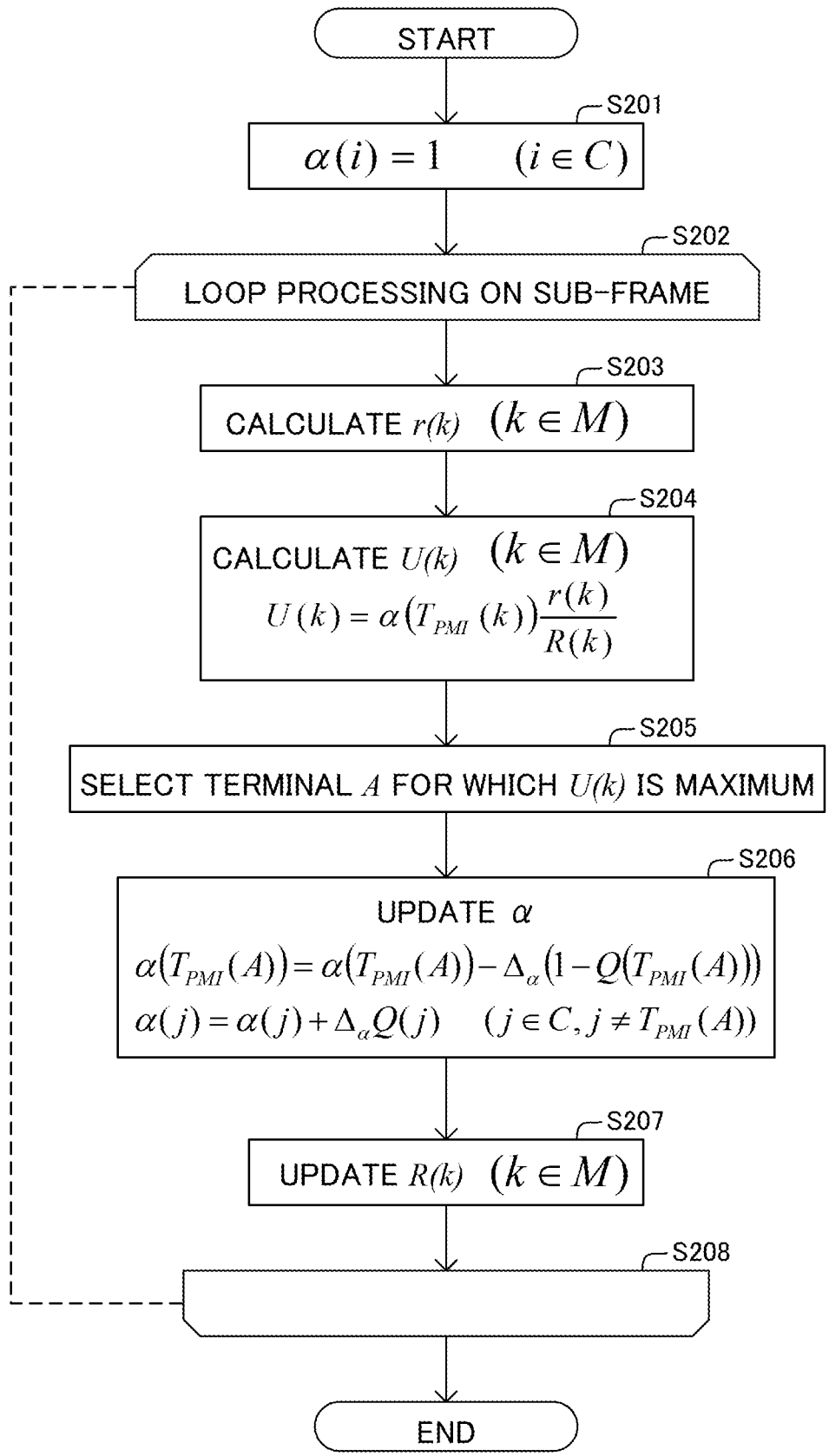
FIG. 10 is a flowchart illustrating an example of processing performed by the macro base station of FIG. 7.

In this example, the wireless communication system 1 is operated as illustrated in FIGS. 9 and 10 each time the performance period of the scheduling has elapses. In this example, the performance period is a time that includes a certain number of sub-frames.

Based on the reference signal transmitted from the macro base station 10-1, the macro terminal 20-1 estimates the state of the communication channel between the macro terminal 20-1 and the macro base station 10-1 (step S101 in FIG. 9). Then, the macro terminal 20-1 transmits, to the macro base station 10-1, the CSI report including the CSI indicating the estimated state of the communication channel.

Based on the reference signal transmitted from the pico base station 10-2, the pico terminal 20-2 estimates the state of the communication channel between the pico terminal 20-2 and the pico base station 10-2. Furthermore, based on the reference signal transmitted from the macro base station 10-1, the pico terminal 20-2 estimates the state of the communication channel between the pico terminal 20-2 and the macro base station 10-1 (step S102 in FIG. 9). Then, the pico terminal 1040 transmits the CSI report including each CSI to the pico base station 10-2.

Steps S101 and S102 may be performed in the order opposite that illustrated in FIG. 9 or may be performed simultaneously.

Based on formula 1 described above and the CSI report received from each pico terminal 20, the pico base station 10-2 calculates the pico-side desired weight $w_p$ for each PMI (step S103 in FIG. 9). Then, the pico base station 10-2 transmits the pico-side desired weight report including the calculated pico-side desired weight $w_p$ to the macro base station 10-1.

Based on formula 3 described above and the CSI report received from each macro terminal 20, the macro base station 10-1 calculates the macro-side desired weight $w_m$ for each PMI (step S104 in FIG. 9).

Steps S103 and S104 may be performed in the order opposite that illustrated in FIG. 9 or may be performed simultaneously.

Based on formula 4 described above, the pico-side desired weight $w_p$ included in the received pico-side desired weight report and the calculated macro-side desired weight $w_m$, the macro base station 10-1 calculates the target value Q of the allocation rate for each PMI (step S105 in FIG. 9).

Then, the macro base station 10-1 performs the scheduling of the macro terminal 20 based on the calculated target value Q of the allocation rate for each PMI (step S106 in FIG. 9). In the scheduling of the macro terminal 20, in this example, the macro base station 10-1 performs processing illustrated in FIG. 10 to select the macro terminal 20.

For example, the macro base station 10-1 sets the adjustment factor α for each PMI at the initial value (in this example, "1") (step S201 in FIG. 10).

Then, the macro base station 10-1 performs loop processing (steps S202 to S208 in FIG. 10) in which the sub-frames included in the performance period are regarded as targets to be processed one by one.

In the loop processing, the macro base station 10-1 first calculates the instantaneous throughput r for each macro terminal 20 (step S203 in FIG. 10). Then, the macro base station 10-1 calculates, for each macro terminal 20, the selection metric U based on formula 5 described above and the calculated instantaneous throughput r (step S204 in FIG. 10).

Then, the macro base station 10-1 selects the macro terminal #A where the selection metric U is the maximum as the terminal that allocates the sub-frame to be processed to the downlink communication (step S205 in FIG. 10).

Then, the macro base station 10-1 updates the adjustment factor $\alpha(T_{PMI}(A))$ for $T_{PMI}(A)$ based on formula 6. Here, $T_{PMI}(A)$ represents the PMI included in the CSI indicating the state of the communication channel between the macro terminal #A and the macro base station 10-1. Furthermore, the macro base station 10-1 updates the adjustment factor $\alpha(j)$ for each PMI (here, PMI #j) different from $T_{PMI}(A)$ based on formula 7 (step S206 in FIG. 10). Here, j represents an integer different from $T_{PMI}(A)$.

Then, the macro base station 10-1 updates, for each macro terminal 20, the average throughput R based on the calculated instantaneous throughput r (step S207 in FIG. 10). Step S207 may be performed, instead of at timing between steps S206 and S208, at arbitrary timing in the loop processing described above.

Then, the macro base station 10-1 performs the loop processing described above (steps S202 to S208 in FIG. 10) on all the sub-frames included in the performance period, and then completes the processing illustrated in FIG. 10.

Furthermore, in the scheduling of the macro terminal 20, the macro base station 10-1 allocates, for each of the sub-frames included in the performance period, the wireless resource to the downlink communication with the selected macro terminal 20.

Then, in the scheduling of the macro terminal 20, the macro base station 10-1 determines, for each of the sub-frames included in the performance period, the PM to be used for the allocated wireless resource. In this example, the macro base station 10-1 determines the PM used for the allocated wireless resource based on the PMI included in the CSI indicating the state of the communication channel between the selected macro terminal 20 and the macro base station 10-1.

The macro base station 10-1 performs the scheduling of the macro terminal 20, and thereafter transmits the scheduling result report indicating the performance result of the scheduling to the pico base station 10-2. The scheduling result report includes, for each sub-frame, the PMI that identifies the PM to be used for the wireless resource.

The pico base station 10-2 performs the scheduling of the pico terminal 20 based on the scheduling result report received from the macro base station 10-1 and the CSI report received from each pico terminal 20 (step S107 in FIG. 9).

In this example, the pico base station 10-2 prioritizes, for each sub-frame, the pico terminal 20 that increases the degree to which the macro-side PM is orthogonal to the pico-side desired PM, and allocates the wireless resource to the communication from the pico base station 10-2 to the pico terminal 20. The macro-side PM is a PM that is identified by the PMI included in the scheduling result report. The pico-side desired PM is a PM that is identified by the PMI included in the CSI indicating the communication channel between the pico base station 10-2 and the pico terminal 20.

Then, the pico base station 10-2 determines the PM used for the allocated wireless resource based on the PMI included in the CSI indicating the state of the communication channel between the pico terminal 20 to which the wireless resource is allocated and the pico base station 10-2.

Thereafter, the macro base station 10-1 communicates with the macro terminal 20 based on the result of the performance of the scheduling by its own station. Likewise, the pico base station 10-2 communicates with the pico terminal 20 based on the result of the performance of the scheduling by its own station.

As described above, the macro base station 10-1 according to the first embodiment controls the scheduling of the macro terminal 20 based on the state of the communication channel between the pico terminal 20 that is a candidate for scheduling by the pico base station 10-2 and the macro base station 10-1.

In this way, the state of the communication channel between the pico terminal 20 that is a candidate for scheduling by the pico base station 10-2 and the macro base station 10-1 can be reflected on the control of the scheduling of the macro terminal 20. Consequently, it is possible to reduce the unbalance of the scheduling of the terminal 20 in each of the macrocell 30-1 and the picocell 30-2.

Furthermore, the macro base station 10-1 according to the first embodiment controls a ratio of the wireless resource for which each PMI is used to the wireless resource of the macrocell 30-1. The control of the ratio is performed based on the state of the communication channel between the macro terminal 20 and the macro base station 10-1 and the state of the communication channel between the pico terminal 20 and the macro base station 10-1.

In this way, it is possible to reduce the continuous use, for the wireless resource of the macrocell 30-1, of either of a beam in a first direction corresponding to the state of a first communication channel and a beam in a second direction corresponding to the state of a second communication channel. Here, the first communication channel is a communication channel between the macro base station 10-1 and the macro terminal 20. The second communication channel is a communication channel between the macro base station 10-1 and the pico terminal 20.

Figure 11:
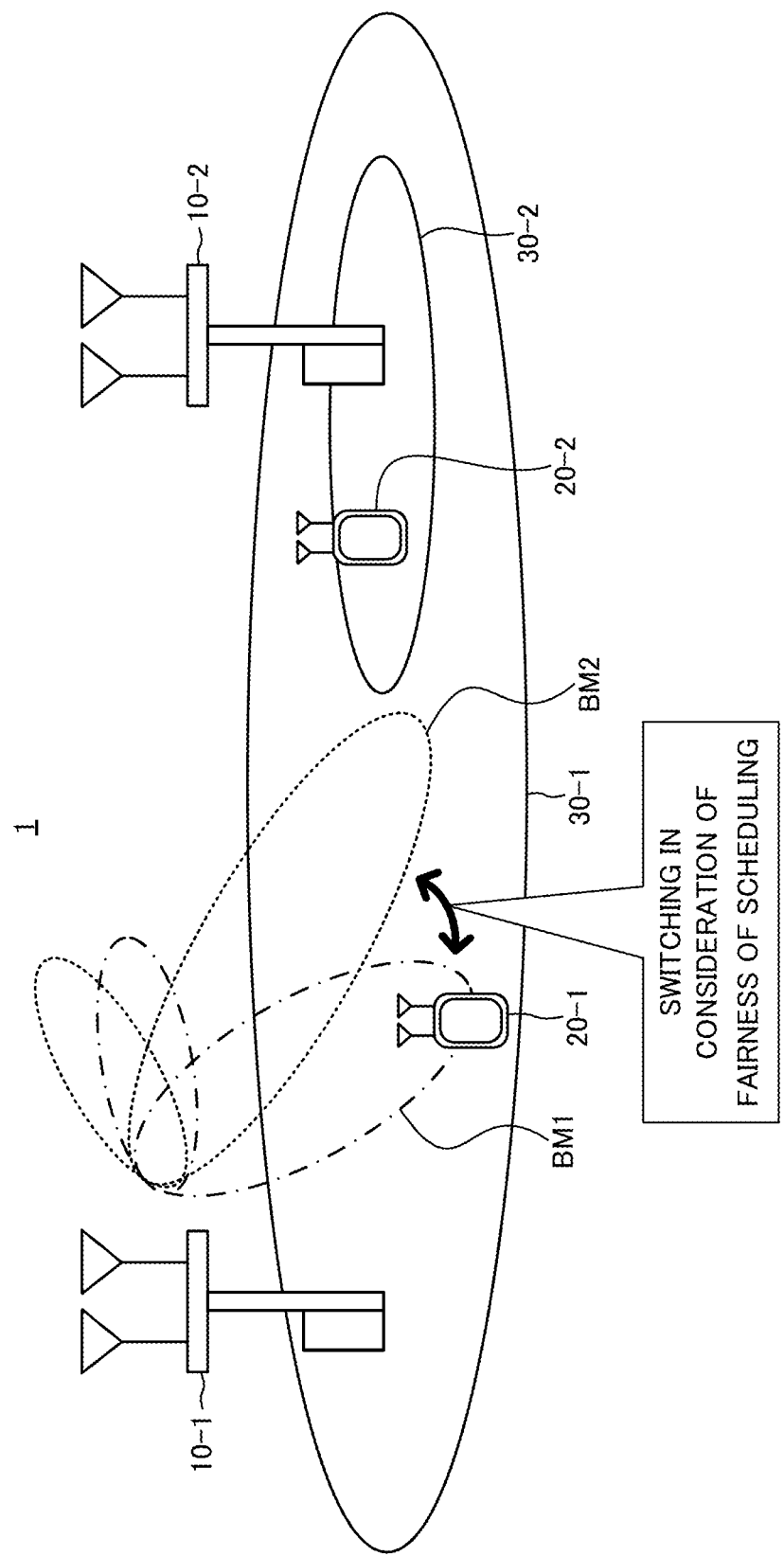
FIG. 11 is an illustrative diagram illustrating an example of the control of the direction of a beam by the operation of FIG. 9.

In other words, as illustrated in FIG. 11, with consideration given to fairness in the scheduling of the terminal 20 in each of the macrocell 30-1 and the picocell 30-2, it is possible to switch between the beam in the first direction BM1 and the beam in the second direction BM2.

In this way, both the beam in the first direction BM1 and the beam in the second direction BM2 can be used for the wireless resource of the macrocell 30-1. Consequently, it is possible to reduce the unbalance of the direction of the beam used for the wireless resource of the macrocell 30-1. Hence, when the scheduling of the terminal 20 is controlled according to the direction of the beam, it is possible to reduce the unbalance of the scheduling of the terminal 20 in each of the macrocell 30-1 and the picocell 30-2.

The pico base station 10-2 may determine the PMI for each pico terminal 20, and calculate the pico-side desired weight $w_p$ based on the determined PMI. This determination of the PMI may be performed based on the PMI included in the CSI.

Likewise, the macro base station 10-1 may determine the PMI for each macro terminal 20, and calculate the macro-side desired weight $w_m$ and the selection metric U based on the determined PMI. This determination of the PMI may be performed based on the PMI included in the CSI.

As described above, in the wireless communication system 1 according to the first embodiment, the macro base station 10-1 is prioritized over the pico base station 10-2 to perform the scheduling of the macro terminal 20. Incidentally, in the wireless communication system 1, the pico base station 10-2 may be prioritized over the macro base station 10-1 to perform the scheduling of the pico terminal 20.

In this case, the macro base station 10-1 calculates the macro-side desired weight $w_m$ based on formula 8 instead of formula 3 described above. Furthermore, the pico base station 10-2 calculates the pico-side desired weight $w_p$ based on formula 9 instead of formula 1 described above. In this case, $T_{PMI}(k)$ represents the PMI included in the CSI indicating the state of the communication channel between the terminal #k and the pico base station 10-2.

$$w_m(i) = \sum_{k \in M} \frac{O(i, T_{PMI}(k))}{\sum_{j \in C} O(j, T_{PMI}(k))} \quad \text{[Formula 8]}$$

$$w_p(i) = \sum_{k \in P} \frac{1 - O(i, T_{PMI}(k))}{\sum_{j \in C} (1 - O(j, T_{PMI}(k)))} \quad \text{[Formula 9]}$$

In this case, the pico base station 10-2 performs the scheduling of the pico terminal 20, and transmits the scheduling result report indicating the result of the performance of the scheduling to the macro base station 10-1. Then, the macro base station 10-1 performs the scheduling of the macro terminal 20 based on the scheduling result report.

<First Variation of the First Embodiment>

A wireless communication system according to a first variation of the first embodiment will then be described. The wireless communication system according to the first variation of the first embodiment differs from the wireless communication system according to the first embodiment in the method of calculating the desired weight. A description will be given below focusing on such a difference.

The wireless communication system 1 according to the first variation of the first embodiment uses formulas 10 and 11 instead of formulas 1 and 3 described above to calculate the pico-side desired weight $w_p$ and the macro-side desired weight $w_m$.

$$w_p(i) = \sum_{k \in P} \frac{D(i, T_{PMI}(k))}{\sum_{j \in C} D(j, T_{PMI}(k))} \quad \text{[Formula 10]}$$

$$w_m(i) = \sum_{k \in M} D'(i, T_{PMI}(k)) \quad \text{[Formula 11]}$$

Here, as represented in formula 12, D(i, j) is a function in which when F(i) is orthogonal to F(j), it is 1 whereas when F(i) is not orthogonal to F(j), it is 0.

As represented in formula 13, D'(i, j) is a function in which when F(i) is equal to F(j), it is 1 whereas when F(i) is not equal to F(j), it is 0.

$$D(i, j) = \begin{cases} 1 & (\text{when } \|F(i)^H F(j)\| = 0) \\ 0 & (\text{otherwise}) \end{cases} \quad \text{[Formula 12]}$$

$$D'(i, j) = \begin{cases} 1 & (\text{when } \|F(i)^H F(j)\| = 1) \\ 0 & (\text{otherwise}) \end{cases} \quad \text{[Formula 13]}$$

Hence, the target value Q(i) of the allocation rate for the PMI #i is increased as the number of pico terminals 20 where the PMI #i is orthogonal to the PM in the PMI included in the CSI indicating the state of the communication channel between the pico terminal 20 and the macro base station 10-1 is increased.

In this way, the probability that a beam in a direction is used can be increased as the number of pico terminals 20 orthogonal to the direction of the beam corresponding to the state of the communication channel between the pico terminal 20 and the macro base station 10-1 is increased. Consequently, it is possible to reduce, in the pico terminal 20, interference from the macro base station 10-1 to the wireless signal from the pico base station 10-2.

Furthermore, the target value Q(i) of the allocation rate for the PMI #i is increased as the number of macro terminals 20 where the PMI #i is equal to the PM in the PMI included in the CSI indicating the state of the communication channel between the macro terminal 20 and the macro base station 10-1 is increased.

In this way, the probability that a beam in a direction is used can be increased as the number of macro terminals 20 equal to the direction of the beam corresponding to the state of the communication channel between the macro terminal 20 and the macro base station 10-1 is increased. Consequently, it is possible to enhance, in the macro terminal 20, the quality of the wireless signal from the macro base station 10-1.

<Second Variation of the First Embodiment>

A wireless communication system according to a second variation of the first embodiment will then be described. The wireless communication system according to the second variation of the first embodiment differs from the first embodiment where the scheduling of the terminal is performed for each sub-frame in that the scheduling of the terminal is performed for each sub-frame and for each frequency band. A description will be given below focusing on such a difference.

The wireless communication system 1 according to the second variation of the first embodiment performs the scheduling of the terminal 20 for each frequency band. In this example, the unit of control is a resource block.

In this example, the wireless communication system 1 uses formulas 14 and 15 instead of formulas 1 and 3 described above to calculate the pico-side desired weight $w_p$ and the macro-side desired weight $w_m$.

$$w_p(i, f) = \sum_{k \in P} \frac{O(i, T_{PMI}(k, f))}{\sum_{j \in C} O(j, T_{PMI}(k, f))} \quad \text{[Formula 14]}$$

$$w_m(i, f) = \sum_{k \in M} \frac{1 - O(i, T_{PMI}(k, f))}{\sum_{j \in C} (1 - O(j, T_{PMI}(k, f)))} \quad \text{[Formula 15]}$$

Here, pico-side desired weight $w_p(i, f)$ indicates a value for the PMI #i and a frequency band #f. The frequency band #f indicates the f-th frequency band. Here, f represents a positive integer. $T_{PMI}(k, f)$ represents the PMI included in the CSI indicating the state of the communication channel between the terminal #k and the macro base station 10-1 in the frequency band #f.

Furthermore, the wireless communication system 1 uses formula 16 instead of formula 4 described above to calculate the target value Q of the allocation rate for each frequency band and each PMI. Q(i, f) represents a value for the PMI #i and the frequency band #f.

$$Q(i, f) = \frac{w_p(i, f) + w_m(i, f)}{\sum_{j \in C} (w_p(j, f) + w_m(j, f))} \quad \text{[Formula 16]}$$

Moreover, the wireless communication system 1 uses formula 17 instead of formula 5 described above to calculate, for each frequency band, the selection metric U for each macro terminal 20. U(k, f) represents a value for the terminal #k and the frequency band #f.

$$U(k, f) = \alpha(T_{PMI}(k, f), f) \frac{r(k, f)}{R(k)} \quad \text{[Formula 17]}$$

Here, α(i, f) represents an adjustment factor for selecting the terminal 20 for the PMI #i and the frequency band #f. Here, r(k, f) represents an instantaneous throughput of the terminal #k in the frequency band #f. R(k) represents the average throughput of the terminal #k. The average throughput R(k) is the average value of a plurality of instantaneous throughputs r(k, f), and a value that is obtained by averaging in the direction of the frequency.

Table 2 represents a brief description of the variables described above.

TABLE 2

| Variables | Description |
| --- | --- |
| $w_p$(i, f) | Desired weight of pico terminal for PMI #i in frequency band #f |
| $w_m$(i, f) | Desired weight of macro terminal for PMI #i in frequency band #f |
| $T_{PMI}$(k) | Optimum PMI for macro base station of terminal #k in frequency band #f |
| Q(i, f) | Target value of allocation rate of PMI #i in frequency band #f |
| U(k, f) | Selection metric of terminal #k in frequency band #f |
| r(k, f) | Instantaneous throughput of terminal #k in frequency band #f |
| R(k) | Average throughput of terminal #k |
| α(i, f) | Adjustment factor of terminal selection for PMI #i in frequency band #f |

With the wireless communication system 1 according to the second variation of the first embodiment, in each frequency band, it is possible to reduce the unbalance of the scheduling of the terminal 20 in each of the macrocell 30-1 and the picocell 30-2.

<Third Variation of the First Embodiment>

A wireless communication system according to a third variation of the first embodiment will then be described. The wireless communication system according to the third variation of the first embodiment differs from the wireless communication system according to the first embodiment in the method of calculating the desired weight. A description will be given below focusing on such a difference.

The wireless communication system 1 according to the third variation of the first embodiment uses formulas 18 and 19 instead of formulas 1 and 3 described above to calculate the pico-side desired weight $w_p$ and the macro-side desired weight $w_m$.

$$w_p(i) = \sum_{k \in P} \frac{t_p(i, k)}{\sum_{j \in C} t_p(j, k)} \quad \text{[Formula 18]}$$

$$w_m(i) = \sum_{k \in M} \frac{t_m(i, k)}{\sum_{j \in C} t_m(j, k)} \quad \text{[Formula 19]}$$

Here, $t_p(i, k)$ represents an expected value for the throughput of the communication from the pico base station 10-2 to the pico terminal #k when the macro base station 10-1 uses the PMI #i. The expected value of the throughput is also referred to as an expected throughput.

Moreover, $t_m(i, k)$ represents an expected value for the throughput of the communication from the macro base station 10-1 to the macro terminal #k when the macro base station 10-1 uses the PMI #i.

In this example, the pico base station 10-2 calculates the expected throughput $t_p(i, k)$ in the pico terminal 20 based on formula 20. Here, $S_p(k)$ represents reception power from the pico base station 10-2 in the terminal #k. $S_m(k)$ represents reception power from the macro base station 10-1 in the terminal #k. I(k) represents other interference power in the terminal #k. The other interference power is reception power of a part, different from radio waves from the macro base station 10-1, of radio waves that interference with the wireless signal received by the pico terminal #k from the pico base station 10-2.

$$t_p(i, k) = \log_2\left(\frac{S_p(k)}{S_m(k)(1 - O(i, T_{PMI}(k))) + I(k)} + 1\right) \quad \text{[Formula 20]}$$

In this example, the macro base station 10-1 calculates the expected throughput $t_m(i, k)$ in the macro terminal 20 based on formula 21. Here, the other interference power I(k) is reception power of a part, different from radio waves from the pico base station 10-2, of radio waves that interference with the wireless signal received by the macro terminal #k from the macro base station 10-1.

$$t_m(i, k) = \log_2\left(\frac{S_m(k)(1 - O(i, T_{PMI}(k)))}{S_p(k) + I(k)} + 1\right) \quad \text{[Formula 21]}$$

Table 3 represents a brief description of the variables described above.

TABLE 3

| Variables | Description |
|---|---|
| $t_p(i, k)$ | Expected throughput in pico terminal #k when macro base station uses PMI #i |
| $t_m(i, k)$ | Expected throughput in macro terminal #k when macro base station uses PMI #i |
| $S_m(k)$ | Reception power from macro base station in terminal #k |
| $S_p(k)$ | Reception power from pico base station in terminal #k |
| I(k) | Other interference power in terminal #k |

Hence, the target value Q(i) of the allocation rate for the PMI #i is increased as the expected throughput in the pico terminal 20 is increased.

In this way, the probability that a beam in a direction is used can be increased as the throughput of the communication between the pico terminal 20 and the pico base station 10-2 based on such a direction is increased. Consequently, it is possible to increase the throughput of the communication between the pico terminal 20 and the pico base station 10-2.

Furthermore, the target value Q(i) of the allocation rate for the PMI #i is increased as the expected throughput in the macro terminal 20 is increased.

In this way, the probability that a beam in a direction is used can be increased as the throughput of the communication between the macro terminal 20 and the macro base station 10-1 based on such a direction is increased. Consequently, it is possible to increase the throughput of the communication between the macro terminal 20 and the macro base station 10-1.

<Fourth Variation of the First Embodiment>

A wireless communication system according to a fourth variation of the first embodiment will then be described. The wireless communication system according to the fourth variation of the first embodiment differs from the wireless communication system according to the first embodiment in that the target value of the allocation rate is determined based on the pico-side desired weight in a plurality of picocells formed within the macro cell. A description will be given below focusing on such a difference.

Figure 12:
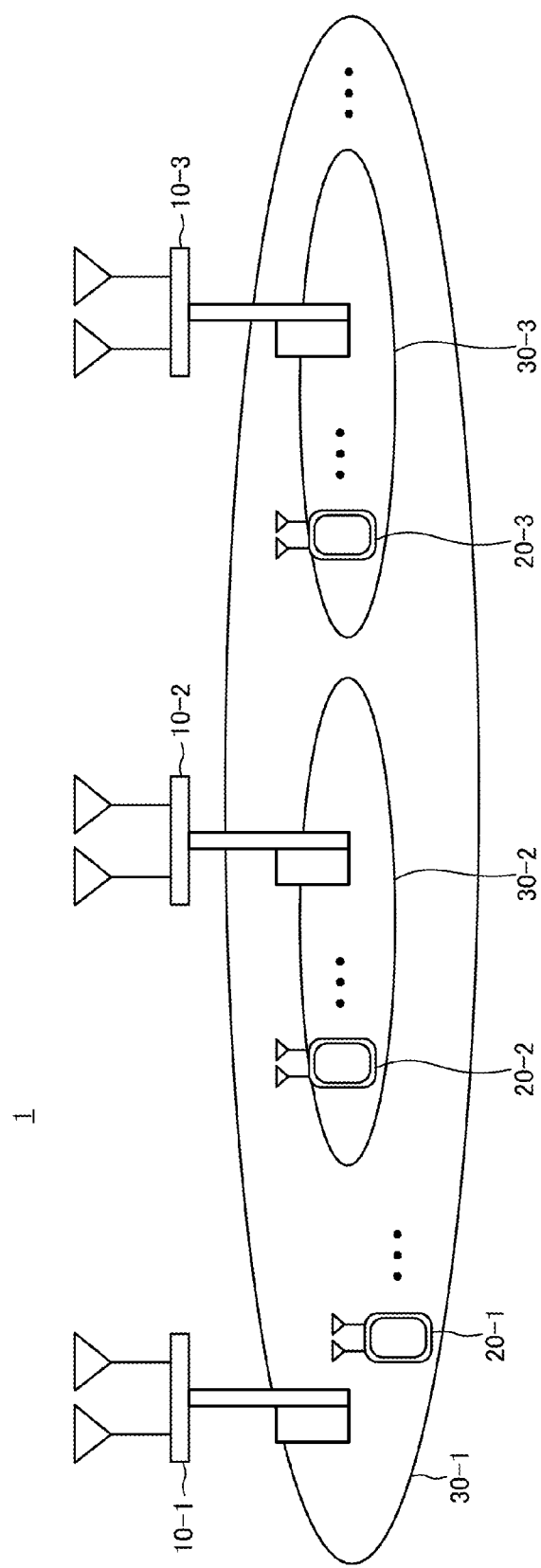
FIG. 12 is a block diagram illustrating an example of the configuration of a wireless communication system according to a fourth variation of the first embodiment.

As illustrated in FIG. 12, in the wireless communication system 1 according to the fourth variation of the first embodiment, within the macrocell 30-1 formed by the macro base station 10-1, $N_p-1$ pico base stations 10-2, 10-3, ..., and 10-$N_p$ are arranged. In this example, $N_p$ represents an integer of 3 or more. In the following description, the pico base station 10-v is also referred to as the pico base station 10 when they do not need to be distinguished. Here, v represents integers from 2 to $N_p$.

Furthermore, a picocell 30-v formed by each pico base station 10-v is located within the macrocell 30-1. The picocell 30-v is also referred to as the picocell 30 when they do not need to be distinguished.

In this example, the terminal 20-1 is located within the macrocell 30-1. In this example, the terminals 20-2 and 20-3 are respectively located within the picocells 30-2 and 30-3. In the following description, the terminal 20 located within the macrocell 30-1 is also referred to as the macro terminal. Likewise, the terminal 20 located within the picocell 30-v is also referred to as the pico terminal.

Each pico terminal 20 is an example of the terminal that is a candidate for the scheduling by the pico base station 10-v.

Each pico base station 10-v calculates the pico-side desired weight $w_p$ based on formula 22 instead of formula 1 described above. The pico-side desired weight $w_p(i, 1)$ represents a value for the PMI #i and a picocell #1. The picocell #1 represents the first picocell 30. P(1) represents an aggregation of the pico terminals 20 located within the first picocell 30.

$$w_p(i, l) = \sum_{k \in P(l)} \frac{O(i, T_{PMI}(k))}{\sum_{j \in C} O(j, T_{PMI}(k))} \quad \text{[Formula 22]}$$

Each pico base station 10-v transmits, to the macro base station 10-1, the pico-side desired weight report including the pico-side desired weight $w_p$ for each PMI.

The macro base station 10-1 calculates the target value Q of the allocation rate for each PMI based on formula 23 instead of formula 4 described above and the pico-side desired weight $w_p$ included in the pico-side desired weight report received from each pico base station 10-v. Here, B is an aggregation of picocells 30.

$$Q(i) = \frac{\sum_{l \in B} w_p(i, l) + w_m(i)}{\sum_{j \in C}\left(\sum_{l \in B} w_p(j, l) + w_m(j)\right)} \quad \text{[Formula 23]}$$

Table 4 represents a brief description of the variables described above.

TABLE 4

| Variables | Description |
| --- | --- |
| $w_p(i, l)$ | Desired weight of pico terminal in picocell #1 for PMI #1 |
| P(l) | An aggregation of pico terminals in picocell #1 |
| B | An aggregation of picocells |

With the wireless communication system 1 according to the forth variation of the first embodiment, it is possible to reduce the unbalance of the scheduling of the terminal 20 in each of the macrocell 30-1 and a plurality of picocells 30-v.

<Fifth Variation of the First Embodiment>

A wireless communication system according to a fifth variation of the first embodiment will then be described. The wireless communication system according to the fifth variation of the first embodiment differs from the wireless communication system according to the first embodiment in that a plurality of PMIs are grouped into a plurality of groups and that based on the allocation rate of each group, the scheduling of the terminal is controlled. A description will be given below focusing on such a difference.

The wireless communication system 1 according to the fifth variation of the first embodiment groups a plurality of PMIs into a plurality of groups. In this example, the group is also referred to as a PMI group. The grouping of the PMIs into a plurality of PMI groups is an example of the grouping of the direction of the beam into a plurality of groups.

The macro base station 10-1 according to the fifth variation of the first embodiment calculates the desired weight $w_{gp}$ of the pico terminal 20 for each PMI group based on formula 24. The desired weight of the pico terminal 20 for the PMI group is also referred to as a pico-side group desired weight. Here, $w_{gp}(1)$ represents a value for a PMI group #1. The PMI group #1 represents the first PMI group. Here, 1 is a positive integer. Here, c(1) represents an aggregation of the PMIs included in the PMI group #1. The inclusion of the PMI in the PMI group is an example of the grouping of the PMIs into the PMI groups.

$$w_{gp}(l) = \sum_{i \in c(l)} w_p(i) \quad \text{[Formula 24]}$$

Furthermore, the macro base station 10-1 calculates the desired weight $w_{gm}$ of the macro terminal 20 for each PMI group based on formula 25. The desired weight of the macro terminal 20 for the PMI group is also referred to as a macro-side group desired weight. Here, $w_{gm}(1)$ represents a value for the PMI group #1.

$$w_{gm}(l) = \sum_{i \in c(l)} w_m(i) \quad \text{[Formula 25]}$$

Instead of the macro base station 10-1, the pico base station 10-2 may calculate the pico-side group desired weight $w_{gp}$. In this case, the pico base station 10-2 may transmit, to the macro base station 10-1, a pico-side group desired weight report including the pico-side group desired weight $w_{gp}$ instead of the pico-side desired weight report including the pico-side desired weight $w_p$.

The macro base station 10-1 uses formula 26 instead of formula 4 described above to calculate the target value $Q_g$ of the allocation rate for each PMI group. Here, $Q_g(1)$ represents a value for the PMI group #1. The allocation rate for the PMI group #1 represents a ratio of the wireless resource for which the PM identified by the PMI included in the PMI group #1 is used to a reference wireless resource. The reference wireless resource is the entire wireless resource that is provided by the macrocell 30-1 and that can be allocated to the communication from the pico base station 10-1 to the macro terminal 20. Here, G represents an aggregation of the PMI groups.

$$Q_g(l) = \frac{w_{gp}(l) + w_{gm}(l)}{\sum_{n \in G}(w_{gp}(n) + w_{gm}(n))} \quad \text{[Formula 26]}$$

Furthermore, the macro base station 10-1 uses formula 27 instead of formula 5 described above to calculate the selection metric U for each macro terminal 20. Here, $\alpha_g(1)$ represents an adjustment factor for selecting the terminal 20 for the PMI group #1. Here, g (i) represents the PMI group including the PMI #i.

$$U(k) = \alpha_g(g(T_{PMI}(k)))\frac{r(k)}{R(k)} \quad \text{[Formula 27]}$$

In this example, the macro base station 10-1 uses "1" as the initial value of the adjustment factor $\alpha_g$.

The macro base station 10-1 respectively uses formulas 28 and 29 instead of formulas 6 and 7 described above to update the adjustment factor $\alpha_g$.

In this example, when the macro base station 10-1 determines, as the PM used for the allocated wireless resource, the PM identified by the PMI included in the PMI group #1, the macro base station 10-1 updates an adjustment factor $\alpha_g(1)$ for the PMI group #1 based on formula 28. Furthermore, in this case, the macro base station 10-1 updates an adjustment factor $\alpha_g(n)$ for the PMI group #n based on formula 29. Here, n represents an integer different from 1.

$$\alpha_g(l) = \alpha_g(l) - \Delta_\alpha(1 - Q_g(l)) \quad \text{[Formula 28]}$$

$$\alpha_g(n) = \alpha_g(n) + \Delta_\alpha Q_g(n) \quad \text{[Formula 29]}$$

Table 5 represents a brief description of the variables described above.

TABLE 5

| Variables | Description |
| --- | --- |
| c(l) | Aggregation of PMIs belonging to PMI group #1 |
| G | Aggregation of PMI groups |
| $w_{gp}(l)$ | Desired weight of pico terminal for PMI group #1 |
| $w_{gm}(l)$ | Desired weight of macro terminal for PMI group #1 |
| $Q_g(l)$ | Target value of allocation rate for PMI group #1 |
| g(i) | PMI group to which PMI #i belongs |
| $\alpha_g(l)$ | Adjustment factor of terminal selection for PMI group #1 |

The wireless communication system 1 according to the fifth variation of the first embodiment controls a ratio of the wireless resource for which the beam identified by the PMI grouped into each PMI group is used to the wireless resource of the macrocell 30-1.

As described above, the wireless communication system 1 according to the first embodiment controls the ratio of the wireless resource for which each PMI is used to the wireless resource of the macrocell 30-1. In this case, a wireless resource that is not allocated to the communication with the terminal 20 may be created.

On the other hand, with the wireless communication system 1 according to the fifth variation of the first embodiment, it is possible to reduce the wireless resource that is not allocated to the communication with the terminal 20.

The wireless communication system 1 may group a plurality of PMIs into a plurality of PMI groups such that a plurality of PMIs included in each PMI group are orthogonal to each other. In this case, the wireless communication system 1 uses formulas 30 and 31 instead of formulas 24 and 25 described above to calculate the pico-side group desired weight $w_{gp}$ and the macro-side group desired weight $w_{gm}$.

$$w_{gp}(g) = \sum_{k \in P} \sum_{i \in c(g)} E_i(T_{PMI}(k))$$ [Formula 30]

$$w_{gm}(g) = \sum_{k \in M} \sum_{i \in c(g)} E_i(T_{PMI}(k))$$ [Formula 31]

Here, $E_i(j)$ represents a function in which when i is equal to j, it is 1 whereas when i is different from j, it is 0.

In this case, the pico base station 10-2 may calculate the pico-side group desired weight $w_{gp}$ without calculating the pico-side desired weight $w_p$. Then, the pico base station 10-2 may transmit, to the macro base station 10-1, instead of the pico-side desired weight report, the pico-side group desired weight report including the pico-side group desired weight $w_{gp}$. The macro base station 10-1 may calculate the macro-side group desired weight $w_{gm}$ without calculating the macro-side desired weight $w_m$.

Second Embodiment

A wireless communication system according to a second embodiment will then be described. The wireless communication system according to the second embodiment differs from the wireless communication system according to the first embodiment in that among a plurality of base stations, the allocation of the PMI used for the wireless resource is shared and that based on the allocation, the scheduling of the terminal is performed. A description will be given below focusing on such a difference.

The macro base station 10-1 according to the second embodiment creates a PMI allocation map based on the target value Q of the allocation rate for each PMI. The PMI allocation map is information with which the PM used for the wireless resource of the macrocell 30-1 is identified for each unit of control. For example, the PMI allocation map includes information in which information for identifying each unit of control is made to correspond to the PMI. The PMI allocation map is an example of information indicating the direction of the beam for each unit of control in the wireless resource. The determination of the PMI is an example of the determination of the direction of the beam.

Figure 13:
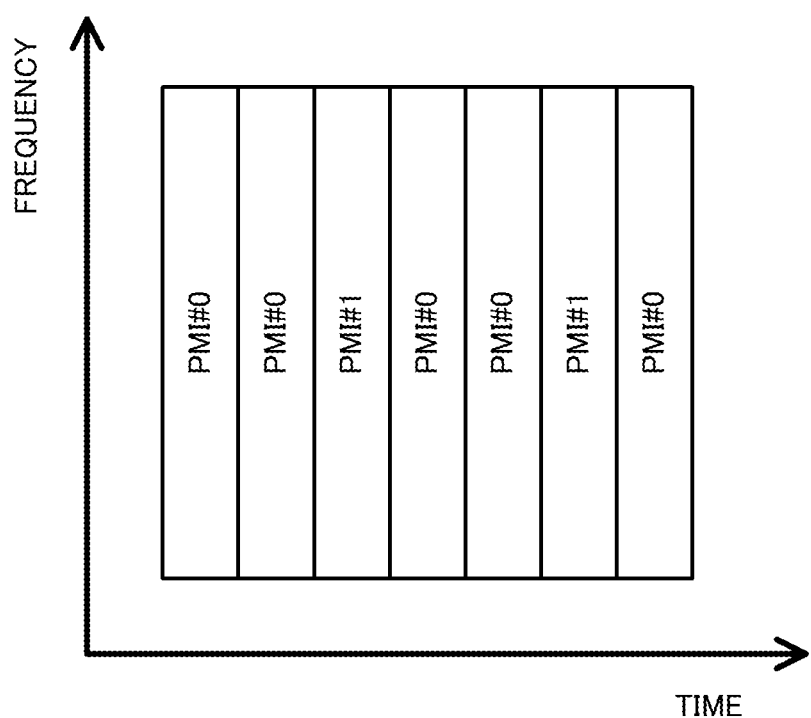
FIG. 13 is an illustrative diagram illustrating an example of a PMI allocation map in a wireless communication system according to a second embodiment.
Figure 14:
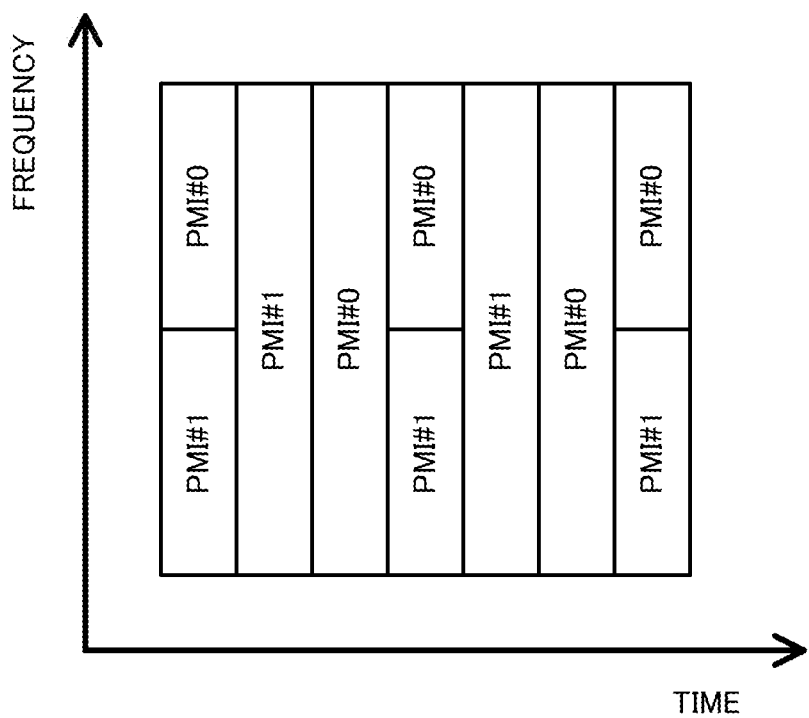
FIG. 14 is an illustrative diagram illustrating an example of a PMI allocation map in a wireless communication system according to a variation of the second embodiment.

In this example, the unit of control is the sub-frame. FIG. 13 illustrates an example of the PMI allocation map. The unit of control may be a unit in which the sub-frame is divided in the direction of the frequency. For example, the unit of control may be the resource block. FIG. 14 illustrates an example of the PMI allocation map when the unit of control is a unit in which the sub-frame is divided in the direction of the frequency.

In this example, the PMI allocation map is created such that for each PMI, the allocation rate in the PMI allocation map is equal to the target value Q.

The macro base station 10-1 transmits, to the pico base station 10-2, a PMI allocation map report including the created PMI allocation map. In this way, the macro base station 10-1 and the pico base station 10-2 share the PMI allocation map.

The macro base station 10-1 performs the scheduling of the macro terminal 20 based on the PMI allocation map. In this example, the macro base station 10-1 allocates, for each unit of control, the wireless resource to the communication with the macro terminal 20 where a macro desired PM is equal to the PM identified by the PMI allocation map. The macro desired PM is a PM that is identified by the PMI included in the CSI indicating the state of the communication channel between the macro terminal 20 and the macro base station 10-1.

The pico base station 10-2 performs the scheduling of the pico terminal 20 based on the PMI allocation map. For example, the pico base station 10-2 prioritizes, for each unit of control, the pico terminal 20 that increases the degree to which the macro-side PM is orthogonal to the pico-side desired PM, and allocates the wireless resource to the communication from the pico base station 10-2 to the pico terminal 20. The macro-side PM is a PM that is identified by the PMI allocation map. The pico-side desired PM is a PM that is identified by the PMI included in the CSI indicating the communication channel between the pico base station 10-2 and the pico terminal 20.

Figure 15:
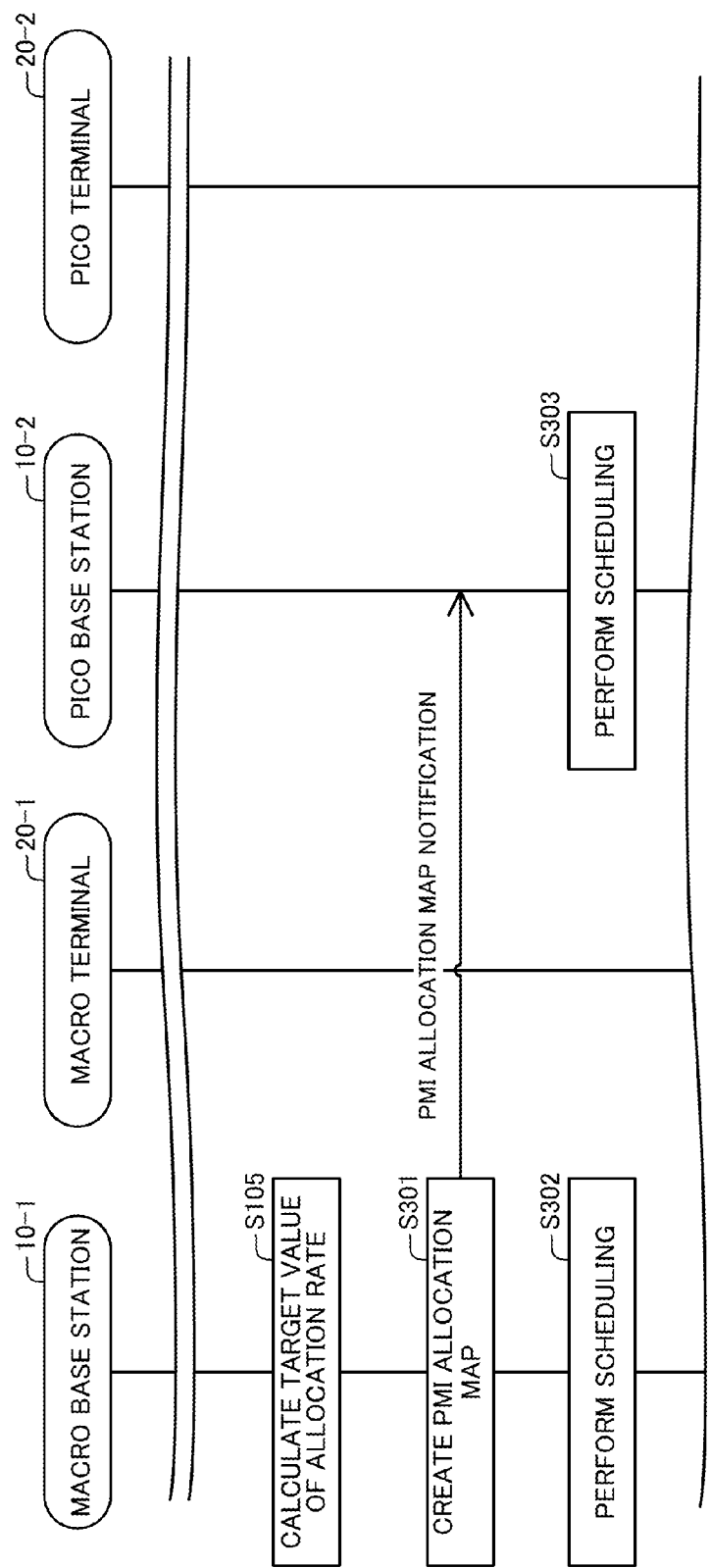
FIG. 15 is a sequence diagram illustrating an example of the operation of the wireless communication system according to the second embodiment.

As illustrated in FIG. 15, the wireless communication system 1 according to the second embodiment performs processing obtained by replacing steps S106 and S107 in FIG. 9 with steps S301 to S303.

Figure 16:
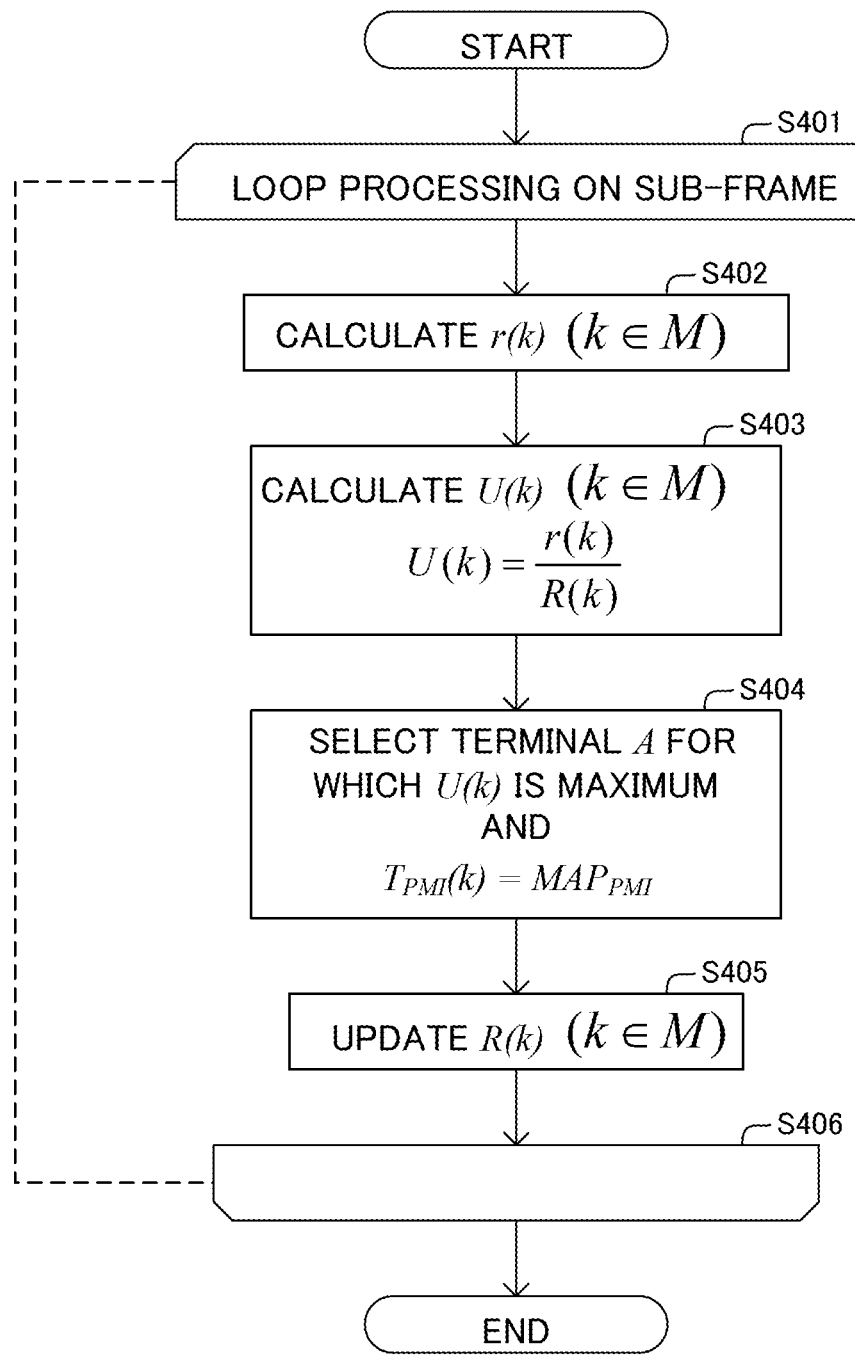
FIG. 16 is a flowchart illustrating an example of processing performed by a macro base station according to the second embodiment.

Furthermore, the macro base station 10-1 according to the second embodiment performs processing illustrated in FIG. 16 instead of the processing illustrated in FIG. 10.

The operation of the wireless communication system 1 will be described below with reference to FIGS. 15 and 16.

The macro base station 10-1 calculates the target value Q of the allocation rate for each PMI (step S105 in FIG. 15), and thereafter creates the PMI allocation map based on the calculated target value Q (step S301 in FIG. 15). Then, the macro base station 10-1 transmits, to the pico base station 10-2, the PMI allocation map report including the created PMI allocation map.

Thereafter, the macro base station 10-1 performs the scheduling of the macro terminal 20 based on the created PMI allocation map (step S302 in FIG. 15).

In the scheduling of the macro terminal 20, in this example, the macro base station 10-1 performs processing illustrated in FIG. 16 to select the macro terminal 20.

For example, the macro base station 10-1 performs the loop processing (steps S401 to S406 in FIG. 16) in which the sub-frames included in the performance period are regarded as targets to be processed one by one.

In the loop processing, the macro base station 10-1 first calculates the instantaneous throughput r for each macro terminal 20 (step S402 in FIG. 16). Then, the macro base station 10-1 calculates, for each macro terminal 20, the selection metric U based on formula 32 and the calculated instantaneous throughput r (step S403 in FIG. 16).

$$U(k) = \frac{r(k)}{R(k)}$$ [Formula 32]

Then, the macro base station 10-1 selects the macro terminal #A satisfying first and second conditions as the terminal that allocates the sub-frame to be processed to the downlink communication (step S404 in FIG. 16). The first condition is a condition under which the PMI made to correspond to the sub-frame to be processed in the PMI allocation map is equal to $T_{PMI}(k)$. The second condition is a condition under which the selection metric U is the maximum. Here, the PMI made to correspond to the sub-frame to be processed in the PMI allocation map is also represented by $MAP_{PMI}$.

Then, the macro base station 10-1 updates, for each macro terminal 20, the average throughput R based on the calculated instantaneous throughput r (step S405 in FIG. 16). Step S405 may be performed, instead of at timing between steps S404 and S406, at arbitrary timing in the loop processing described above.

Then, the macro base station 10-1 performs the loop processing described above (steps S401 to S406 in FIG. 16) on all the sub-frames included in the performance period, and then completes the processing illustrated in FIG. 16.

Furthermore, in the scheduling of the macro terminal 20, the macro base station 10-1 allocates, for each of the sub-frames included in the performance period, the wireless resource to the downlink communication with the selected macro terminal 20.

Then, in the scheduling of the macro terminal 20, the macro base station 10-1 allocates the PMI made to correspond to the sub-frame in the PMI allocation map to each of the sub-frames included in the performance period.

The pico base station 10-2 performs the scheduling of the pico terminal 20 based on the PMI allocation map report received from the macro base station 10-1 and the CSI report received from each pico terminal (step S303 in FIG. 15).

In this example, the pico base station 10-2 prioritizes, for each sub-frame, the pico terminal 20 that increases the degree to which the macro-side PM is orthogonal to the pico-side desired PM, and allocates the wireless resource to the communication from the pico base station 10-2 to the pico terminal 20. The macro-side PM is a PM that is identified by the PMI made to correspond to the sub-frame in the PMI allocation map. The pico-side desired PM is a PM that is identified by the PMI included in the CSI indicating the communication channel between the pico base station 10-2 and the pico terminal 20.

Then, the pico base station 10-2 determines the PM used for the allocated wireless resource based on the PMI included in the CSI indicating the state of the communication channel between the pico terminal 20 to which the wireless resource is allocated and the pico base station 10-2.

Thereafter, the macro base station 10-1 communicates with the macro terminal 20 based on the result of the performance of the scheduling by its own station. Likewise, the pico base station 10-2 communicates with the pico terminal 20 based on the result of the performance of the scheduling by its own station.

As described above, as in the first embodiment, the wireless communication system 1 according to the second embodiment can reduce the unbalance of the scheduling of the terminal 20 in each of the macrocell 30-1 and the picocell 30-2.

Furthermore, with the wireless communication system 1 according to the second embodiment, it is possible to omit the following step: one base station 10 of the macro base station 10-1 and the pico base station 10-2 performs the scheduling of the terminal 20, and thereafter the result of the performance is notified to the other base station 10.

It is possible to reduce the unbalance of the scheduling of the terminals.

All examples and conditional language provided herein are intended for pedagogical purposes to aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wireless communication system comprising:
   a first access point that forms a first wireless area; and
   a second access point that forms a second wireless area, wherein the first access point including:
   a receiver configured to receive, from a terminal which is a candidate for scheduling by the second access point, information indicating a state of a communication channel between the terminal and the first access point; and
   a scheduler configured to control scheduling of a terminal located in the first wireless area based on the received information, the terminal located in the first wireless area being different from the terminal which is the candidate for scheduling by the second access point,
   wherein the scheduling includes allocation of a wireless resource to communication with the terminal and determination of the direction of a beam used for formation of the first wireless area and used for the allocated wireless resource to be any one of a plurality of directions, and
   the control includes control of a ratio of a wireless resource for which the beam in each direction is used to a wireless resource in the first wireless area based on a state of a communication channel between a terminal located in the first wireless area and the first access point and the state of the communication channel between the terminal, which is located in the second wireless area and which is the candidate, and the first access point.

2. The wireless communication system according to claim 1,
   wherein a ratio of a wireless resource for which the beam in a direction is used to the wireless resource in the first wireless area is increased as the number of terminals located in the second wireless area, the direction being orthogonal to a direction of the beam corresponding to a state of a communication channel between each of the terminals and the first access point is increased.

3. The wireless communication system according to claim 1,
   wherein a ratio of a wireless resource for which the beam in a direction is used to the wireless resource in the first wireless area is increased as the number of terminals located in the first wireless area, the direction coinciding with a direction of the beam corresponding to a state of a communication channel between each of the terminals and the first access point is increased.

4. The wireless communication system according to claim 1,
   wherein a ratio of a wireless resource for which the beam in a direction is used to the wireless resource in the first wireless area is increased as a degree to which the direction is orthogonal to a direction of the beam corresponding to a state of a communication channel between each of terminals located in the second wireless area and the first access point is increased.

5. The wireless communication system according to claim 1,
wherein a ratio of a wireless resource for which the beam in a direction is used to the wireless resource in the first wireless area is increased as a degree to which the direction coincides with a direction of the beam corresponding to a state of a communication channel between each of terminals located in the first wireless area and the first access point is increased.

6. The wireless communication system according to claim 1,
wherein the scheduling includes determination of the direction of the beam used for the allocated wireless resource to be a direction corresponding to a state of a communication channel between the terminal to which the wireless resource is allocated and the first access point, and
the control includes determination of a target value of the ratio and control of a probability that the wireless resource is allocated to the communication with the terminal located in the first wireless area based on the target value such that the ratio of the wireless resource for which the beam in each direction is used to the wireless resource in the first wireless area coincides with the target value.

7. The wireless communication system according to claim 1,
wherein, based on the ratio, a direction of the beam used for the wireless resource in the first wireless area is determined for each control unit of the wireless resource, and
the first access point and the second access point control, based on the determined direction, scheduling of the terminal located in the first wireless area and the terminal located in the second wireless area, respectively.

8. The wireless communication system according to claim 7,
wherein the first access point
determines, based on the ratio, the direction of the beam used for the wireless resource in the first wireless area for the each control unit of the wireless resource, and
notifies information indicating the determined direction of the beam to the second access point.

9. The wireless communication system according to claim 1,
wherein a ratio of a wireless resource for which the beam in a direction is used to the wireless resource in the first wireless area is increased as a throughput, based on a reception power of the beam in the direction from the first access point in the terminal located in the second wireless area, of communication between the terminal and the second access point is increased.

10. The wireless communication system according to claim 1,
wherein a ratio of a wireless resource for which the beam in a direction is used to the wireless resource in the first wireless area is increased as a throughput, based on a reception power of the beam in the direction from the first access point in the terminal located in the first wireless area, of communication between the terminal and the first access point is increased.

11. The wireless communication system according to claim 1,
wherein the control
groups the plurality of directions into a plurality of groups and
includes control of a ratio of a wireless resource for which the beam in at least one direction grouped in each group is used to the wireless resource in the first wireless area.

12. A wireless communication control method in a wireless communication system comprising a first access point that forms a first wireless area and a second access point that forms a second wireless area, the wireless communication control method comprising:
by the first access point,
controlling scheduling of a terminal located in the first wireless area based on a state of a communication channel between a terminal which is a candidate for scheduling by the second access point and the first access point, the terminal located in the first wireless area being different from the terminal which is the candidate for scheduling by the second access point,
wherein the scheduling includes allocation of a wireless resource to communication with the terminal and determination of the direction of a beam used for formation of the first wireless area and used for the allocated wireless resource to be any one of a plurality of directions,
the control includes control of a ratio of a wireless resource for which the beam in each direction is used to a wireless resource in the first wireless area based on a state of a communication channel between a terminal located in the first wireless area and the first access point and the state of the communication channel between the terminal, which is located in the second wireless area and which is the candidate, and the first access point.

13. An access point,
configured to form a first wireless area, and
comprising:
a receiver configured to receive, from a terminal which is a candidate for scheduling by the second access point, information indicating a state of a communication channel between the terminal and the first access point; and
a scheduler configured to control scheduling of a terminal located in the first wireless area based on the received information, the terminal located in the first wireless area being different from the terminal which is the candidate for scheduling by the another access point,
wherein the scheduling includes allocation of a wireless resource to communication with the terminal and determination of the direction of a beam used for formation of the first wireless area and used for the allocated wireless resource to be any one of a plurality of directions, and
the control includes control of a ratio of a wireless resource for which the beam in each direction is used to a wireless resource in the first wireless area based on a state of a communication channel between a terminal located in the first wireless area and the access point forming the first wireless area and the state of the communication channel between the terminal, which is located in the second wireless area and which is the candidate, and the access point forming the first wireless area.

* * * * *